(12) United States Patent
Yagi et al.

(10) Patent No.: US 10,532,733 B2
(45) Date of Patent: Jan. 14, 2020

(54) START CONTROL DEVICE FOR HYBRID VEHICLE

(71) Applicant: Nissan Motor Co., Ltd., Yokohama-shi, Kanagawa (JP)

(72) Inventors: Hidekazu Yagi, Kanagawa (JP); Masato Koga, Kanagawa (JP); Atsushi Tsukizaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 198 days.

(21) Appl. No.: 15/575,841

(22) PCT Filed: Jun. 4, 2015

(86) PCT No.: PCT/JP2015/066200
§ 371 (c)(1),
(2) Date: Nov. 21, 2017

(87) PCT Pub. No.: WO2016/194195
PCT Pub. Date: Dec. 8, 2016

(65) Prior Publication Data
US 2018/0354494 A1   Dec. 13, 2018

(51) Int. Cl.
*B60W 20/30* (2016.01)
*B60K 6/36* (2007.10)
(Continued)

(52) U.S. Cl.
CPC .............. *B60W 20/30* (2013.01); *B60K 6/36* (2013.01); *B60K 6/38* (2013.01); *B60K 6/442* (2013.01);
(Continued)

(58) Field of Classification Search
CPC . B60K 6/36; B60K 6/38; B60K 6/442; B60K 6/547; B60W 10/02; B60W 10/06;
(Continued)

(56) References Cited

U.S. PATENT DOCUMENTS

2013/0186233 A1\* 7/2013 Kaltenbach ............ B60K 6/442
74/661

FOREIGN PATENT DOCUMENTS

DE    102008043338 A1    5/2010
DE    102010003748 A1    10/2011
(Continued)

*Primary Examiner* — Maceeh Anwari
(74) *Attorney, Agent, or Firm* — Global IP Counselors, LLP

(57) ABSTRACT

A hybrid vehicle start control device is provided for a hybrid vehicle that ensures an EV reverse starting intended by a driver, even when an engagement command is issued to an engagement clutch that selects an ICE gear shift stage, when carrying out EV reverse starting. In this hybrid vehicle, a multistage gear transmission includes an EV shift actuator that selects an EV gear shift stage, and ICE shift actuators that select an ICE gear shift stage. A starting controller operates the EV electric actuator to select EV 1st of the multistage gear transmission at a time of starting, and that carries out an EV starting using the first motor/generator. At a time of an EV reverse starting, the starting controller carries out a control to the operating positions of the ICE shift actuators that prevent the selection of the ICE gear shift stage by the ICE shift actuators.

17 Claims, 13 Drawing Sheets

(51) Int. Cl.
*B60K 6/442* (2007.10)
*B60K 6/547* (2007.10)
*B60W 10/06* (2006.01)
*B60W 10/08* (2006.01)
*B60W 10/11* (2012.01)
*B60W 30/18* (2012.01)
*F16H 61/18* (2006.01)
*B60W 20/20* (2016.01)
*B60W 10/10* (2012.01)
*B60W 20/00* (2016.01)
*B60W 50/12* (2012.01)
*B60K 6/38* (2007.10)
*B60W 10/02* (2006.01)
*B60W 20/40* (2016.01)

(52) U.S. Cl.
CPC ............. *B60K 6/547* (2013.01); *B60W 10/02* (2013.01); *B60W 10/06* (2013.01); *B60W 10/08* (2013.01); *B60W 10/10* (2013.01); *B60W 10/11* (2013.01); *B60W 20/00* (2013.01); *B60W 20/20* (2013.01); *B60W 20/40* (2013.01); *B60W 30/18027* (2013.01); *B60W 30/18036* (2013.01); *B60W 50/12* (2013.01); *F16H 61/18* (2013.01); *Y02T 10/6234* (2013.01); *Y02T 10/6286* (2013.01)

(58) Field of Classification Search
CPC ...... B60W 10/08; B60W 10/10; B60W 10/11; B60W 20/00; B60W 20/20; B60W 20/40; B60W 30/18027; B60W 30/18036; B60W 50/12; F16H 61/18
USPC .......................................................... 701/22
See application file for complete search history.

(56) References Cited

FOREIGN PATENT DOCUMENTS

| | | |
|---|---|---|
| DE | 10 2010 032 299 A1 | 1/2012 |
| EP | 2733001 A1 | 5/2014 |
| JP | 2005-263184 A | 9/2005 |
| JP | 2007-100866 A | 4/2007 |
| JP | 2007-106394 A | 4/2007 |
| JP | 2011-161939 A | 8/2011 |

* cited by examiner

ENGAGEMENT TABLE

| C2 | C3 | C1 Left | C1 N | C1 Right |
|---|---|---|---|---|
| N | N | EV – ICEgen | Neutral | EV – ICE 3rd |
| N | Left | EV 1st ICE 1st | EV 1st ICE – | EV 1st ICE 3rd |
| N | Left | Lock | EV 1st ICE 2nd | Lock |
| Left | N | EV 1.5 ICE 2nd | EV – ICE 2nd | Lock |
| Left | N | Lock | EV 2nd ICE 2nd | Lock |
| N | Right | EV 2nd ICE 3rd' | EV 2nd ICE – | EV 2nd ICE 3rd |
| N | Right | Lock | EV 2nd ICE 4th | Lock |
| Right | N | EV 2.5 ICE 4th | EV – ICE 4th | Lock |
| Right | Left | Lock | EV 1st ICE 4th | Lock |

 : NORMAL USE GEAR SHIFT STAGE

 : GEAR SHIFT STAGE USED AT LOW SOC, ETC.

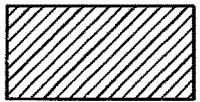 : GEAR SHIFT STAGE THAT CANNOT BE SELECTED BY SHIFT MECHANISM

 : GEAR SHIFT STAGE NOT NORMALLY USED

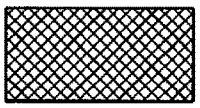 : GEAR SHIFT STAGE THAT CANNOT BE SELECTED BY INTERLOCK

FIG. 4

START CONTROL DEVICE FOR HYBRID VEHICLE

CROSS-REFERENCE TO RELATED APPLICATIONS

This application is a U.S. National stage application of International Application No. PCT/JP2015/066200, filed Jun. 4, 2015.

BACKGROUND

Field of the Invention

The present invention relates to a start control device for a hybrid vehicle, the drive system of which is provided with a transmission that realizes an EV gear shift stage and an ICE gear shift stage, and that selects the EV gear shift stage to carry out EV reverse starting.

Background Information

Conventionally, a power transmission device for a hybrid vehicle, comprising an electric motor and an internal combustion engine as power sources, provided with a transmission that realizes a plurality of gear shift stages in a drive system from the power sources to the drive wheels, and comprising a power interrupting means that is meshing engaged by a stroke from a disengaged position, is known (for example, refer to Japanese Laid-Open Patent Application No. 2011-161939—Patent Document 1).

SUMMARY

However, the conventional device is configured such that, in a stopped state of the vehicle, the power interrupting means that connects the internal combustion engine and the electric motor with the drive wheels can be brought into a disconnected state to generate electricity by driving the electric motor with the internal combustion engine. Consequently, at the time of an EV reverse starting, in which the electric motor and the drive wheels are connected, and the vehicle is started by reversely rotating the electric motor, if the power interrupting means, which is in the disconnected state, is stroked due to an abnormality in the electronic control system, or the like, the drive wheels and the internal combustion engine in a driving state will transition to the engaged state. Therefore, a flow of driving force leading from the internal combustion engine toward the drive wheels is formed, and there is the risk that the vehicle will start in the forward direction, which is opposite of the reverse direction intended by the driver.

In view of the problems described above, an object of the present invention is to provide a start control device for a hybrid vehicle that ensures an EV reverse starting intended by a driver, even when an engagement command is issued to an engagement clutch that selects an ICE gear shift stage, when carrying out the EV reverse starting.

In order to achieve the object described above, the hybrid vehicle of the present invention comprises an electric motor and an internal combustion engine as drive sources and is provided with a transmission that realizes a plurality of gear shift stages in a drive system from the power sources to the drive wheel. The transmission does not have starting elements but comprises, as shifting elements for switching between an EV gear shift stage by the electric motor and an ICE gear shift stage by the internal combustion engine, a plurality of engagement clutches for meshing engagement due to a stroke from a neutral position. In the hybrid vehicle, an EV shift actuator that selects the EV gear shift stage and an ICE shift actuator that selects the ICE gear shift stage are provided to the transmission. Also provided is a starting controller that causes the EV shift actuator to select the EV gear shift stage of the transmission at the time of starting, and that carries out an EV starting using the electric motor as the drive source. The starting controller is configured as a mechanism for preventing the selection of the ICE gear shift stage by the ICE shift actuator at the time of EV reverse starting, and rotates the electric motor in a direction opposite to the forward rotation direction of the internal combustion engine.

Therefore, the starting controller is configured as a mechanism that causes the EV shift actuator to select the EV gear shift stage of the transmission and that prevents the selection of the ICE gear shift stage by the ICE shift actuator at the time of EV reverse starting, and the electric motor is rotated in a direction opposite to the forward direction of rotation of the internal combustion engine. That is, selection of the ICE gear shift stage by the ICE shift actuator is prevented even when an engagement command is issued to an engagement clutch that selects the ICE gear shift stage due to an abnormality in the electronic control system. Thus, a torque transmission cutoff state is ensured, in which the power transmission path between the internal combustion engine and the drive wheels is disconnected at the position of the engagement clutch that selects the ICE gear shift stage. On the other hand, since a drive power transmission path via the EV gear shift stage is formed between the electric motor and the drive wheels, if the electric motor is reversely rotated, an EV reverse starting is carried out. As a result, an EV reverse starting intended by the driver can be ensured, even when an engagement command is issued to engagement clutches C1, C2 that select an ICE gear shift stage, when carrying out the EV reverse starting.

BRIEF DESCRIPTION OF THE DRAWINGS

Referring now to the drawings, a start control device for a hybrid vehicle is illustrated.

FIG. 4 is an engagement table illustrating the gear shift stages according to the switching positions of three engagement clutches in a multistage gear transmission mounted on a hybrid vehicle to which is applied the start control device of the first embodiment.

DETAILED DESCRIPTION OF THE EMBODIMENTS

Figure 1:
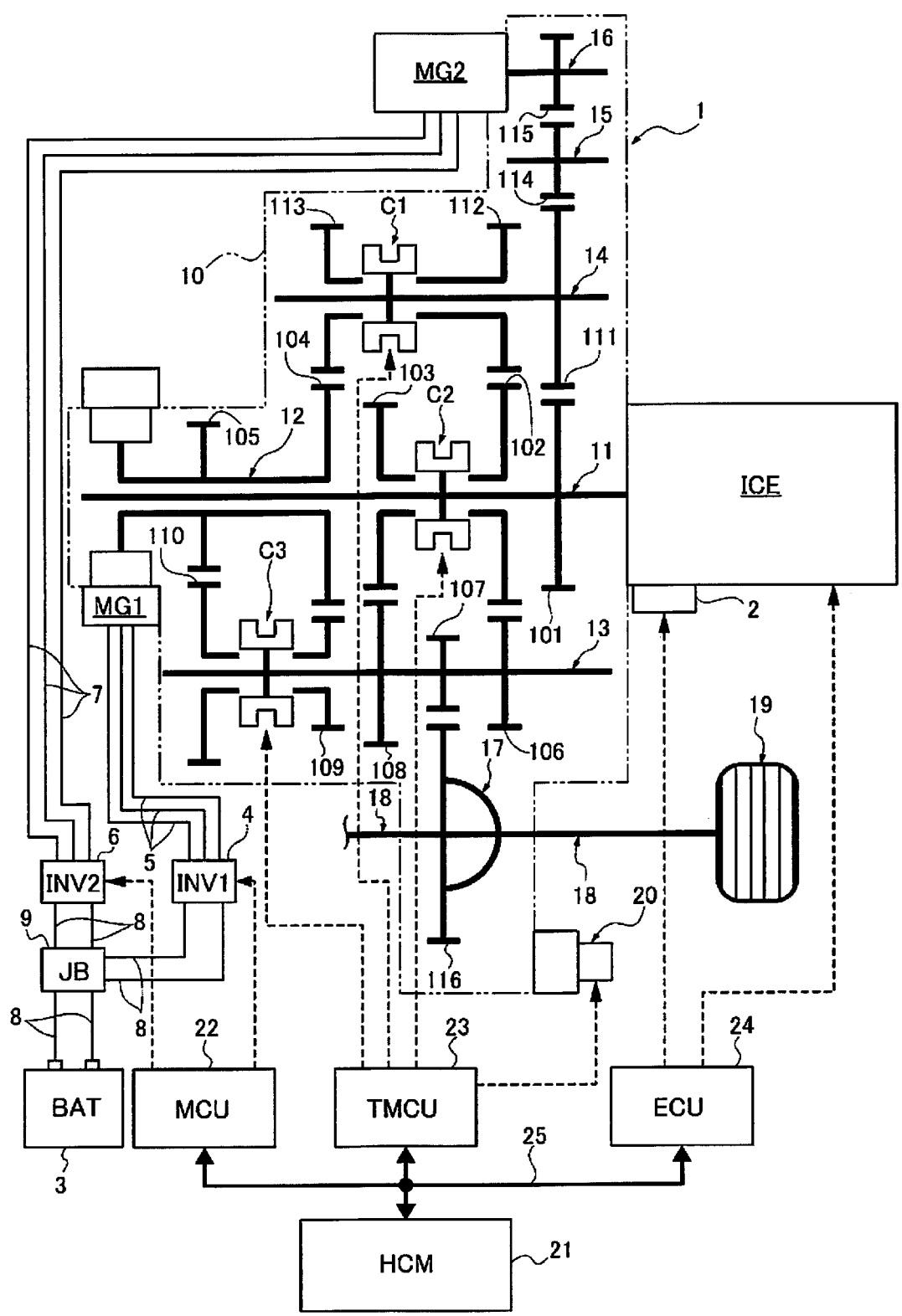
FIG. 1 is an overall system diagram illustrating a drive system and a control system of a hybrid vehicle to which is applied the start control device of the first embodiment.

A preferred embodiment for realizing the device for controlling starting of an electrically driven vehicle according to the present invention is described below based on the first embodiment and the second embodiment illustrated in the drawings.

First Embodiment

The configuration is described first. The start control device of the first embodiment is applied to a hybrid vehicle (one example of a hybrid vehicle), comprising, as drive system components, one engine, two motor/generators, and a multistage gear transmission having three engagement clutches. The "overall system configuration," the "configuration of the shift control system," the "configuration of the gear shift stages," the "detailed configuration of the C1/C2 select operation mechanism," and the "configuration of the starting control process" will be described separately below, regarding the configuration of the start control device for a hybrid vehicle in the first embodiment.

Overall System Configuration

FIG. 1 illustrates a drive system and a control system of a hybrid vehicle to which is applied the start control device of the first embodiment. The overall system configuration will be described below based on FIG. 1.

The drive system of the hybrid vehicle comprises an internal combustion engine ICE, a first motor/generator MG1, a second motor/generator MG2, and a multistage gear transmission 1 having three engagement clutches C1, C2, C2, as illustrated in FIG. 1. "ICE" is an acronym for "Internal Combustion Engine."

The internal combustion engine ICE is, for example, a gasoline engine or a diesel engine that is disposed in a forward area of a vehicle such that the crankshaft direction is aligned in the vehicle width direction. The internal combustion engine ICE is connected to a transmission case 10 of the multistage gear transmission 1, and the output shaft of the internal combustion engine is connected to a first shaft 11 of the multistage gear transmission 1. The internal combustion engine ICE basically carries out an MG2 start, where the second motor/generator MG2 is used as a starter motor. However, a starter motor 2 remains available for when an MG2 start using a high-power battery 3 cannot be ensured, such as during extreme cold.

Both the first motor/generator MG1 and the second motor/generator MG2 are permanent magnet type synchronous motors utilizing three-phase alternating current, having the high-power battery 3 as a common power source. The stator of the first motor/generator MG1 is fixed to a case of the first motor/generator MG1, and the case is fixed to the transmission case 10 of the multistage gear transmission 1. Then, a first motor shaft integrated with a rotor of the first motor/generator MG1 is connected to a second shaft 12 of the multistage gear transmission 1. The stator of the second motor/generator MG2 is fixed to a case of the second motor/generator MG2, and the case is fixed to the transmission case 10 of the multistage gear transmission 1. Then, a second motor shaft integrated with a rotor of the second motor/generator MG2 is connected to a sixth shaft 16 of the multistage gear transmission 1. A first inverter 4, which converts direct current to three-phase alternating current during powering and converts three-phase alternating current to direct current during regeneration, is connected to a stator coil of the first motor/generator MG1, via a first AC harness 5. A second inverter 6, which converts direct current into three-phase alternating current during powering and converts three-phase alternating current into direct current during regeneration, is connected to a stator coil of the second motor/generator MG2, via a second AC harness 7. The high-power battery 3, the first inverter 4, and the second inverter 6 are connected by a DC harness 8 via a junction box 9.

The multistage gear transmission 1 is a normally meshing transmission comprising a plurality of gear pairs having different transmission ratios, and comprises six gear shafts 11-16 provided with gears and disposed parallel to each other inside the transmission case 10, and three engagement clutches C1, C2, C3 for selecting a gear pair. A first shaft 11, a second shaft 12, a third shaft 13, a fourth shaft 14, a fifth shaft 15, and a sixth shaft 16 are provided as gear shafts. A first engagement clutch C1, a second engagement clutch C2, and a third engagement clutch C3 are provided as engagement clutches. The transmission case 10 is provided with an electric oil pump 20 that supplies lubrication oil to the meshing portions of the gears and the axle bearing portions inside the case.

The first shaft 11 is a shaft to which the internal combustion engine ICE is connected, and a first gear 101, a second gear 102, and a third gear 103 are disposed on the first shaft 11, in that order from the right in FIG. 1. The first gear 101 is integrally provided (including integral attachment) to the first shaft 11. The second gear 102 and the third gear 103 are idling gears, in which a boss portion that protrudes in the axial direction is inserted into the outer perimeter of the first shaft 11, and are provided so as to be drivably connectable to the first shaft 11 via the second engagement clutch C2.

The second shaft 12 is a shaft to which the first motor/generator MG1 is connected, and is a cylindrical shaft that is coaxially disposed with the axis aligned with the outer side position of the first shaft 11, and a fourth gear 104 and a fifth gear 105 are disposed on the second shaft 12, in that order from the right in FIG. 1. The fourth gear 104 and the fifth gear 105 are integrally provided (including integral attachment) to the second shaft 12.

The third shaft 13 is a shaft disposed on the output side of the multistage gear transmission 1, and a sixth gear 106, a seventh gear 107, an eighth gear 108, a ninth gear 109, and a tenth gear 110 are disposed on the third shaft 13, in that order from the right in FIG. 1. The sixth gear 106, the seventh gear 107, and the eighth gear 108 are integrally provided (including integral attachment) to the third shaft 13. The ninth gear 109 and the tenth gear 110 are idling gears, in which a boss portion that protrudes in the axial direction is inserted into the outer perimeter of the third shaft 13, and are provided so as to be drivably connectable to the third shaft 13 via the third engagement clutch C3. Then, the sixth gear 106 meshes with the second gear 102 of the first shaft 11, the seventh gear 107 meshes with a sixteenth gear 116 of a differential gear 17, and the eighth gear 108 meshes with the third gear 103 of the first shaft 11. The ninth gear 109 meshes with the fourth gear 104 of the second shaft 12, and the tenth gear 110 meshes with the fifth gear 105 of the second shaft 12.

The fourth shaft 14 is a shaft in which both ends are supported to the transmission case 10, and an eleventh gear 111, a twelfth gear 112, and a thirteenth gear 113 are disposed on the fourth shaft 14, in order from the right side in FIG. 1. The eleventh gear 111 is integrally provided (including integral attachment) to the fourth shaft 14. The twelfth gear 112 and the thirteenth gear 113 are idling gears, in which a boss portion that protrudes in the axial direction is inserted into the outer perimeter of the fourth shaft 14, and are provided so as to be drivably connectable to the fourth shaft 14 via the first engagement clutch C1. Then, the eleventh gear 111 meshes with the first gear 101 of the first shaft 11, the twelfth gear 112 meshes with a second gear 102 of the first shaft 11, and the thirteenth gear 113 meshes with the fourth gear 104 of the second shaft 12.

The fifth shaft 15 is a shaft in which both ends are supported to the transmission case 10, and a fourteenth gear 114 that meshes with the eleventh gear 111 of the fourth shaft 14 is integrally provided thereto (including integral attachment).

The sixth shaft 16 is a shaft to which the second motor/generator MG2 is connected, and a fifteenth gear 115 that meshes with the fourteenth gear 114 of the fifth shaft 15 is integrally provided thereto (including integral attachment).

The second motor/generator MG2 and the internal combustion engine ICE are mechanically connected to each other by a gear train configured from the fifteenth gear 115, the fourteenth gear 114, the eleventh gear 111, and the first gear 101, which mesh with each other. The gear train serves as a reduction gear train that decelerates the MG2 rotation speed at the time of an MG2 start of the internal combustion engine ICE by the second motor/generator MG2, and serves as a speed increasing gear train that accelerates the engine rotation speed at the time of MG2 power generation for generating the second motor/generator MG2, by the driving of the internal combustion engine ICE.

The first engagement clutch C1 is a dog clutch that is interposed between the twelfth gear 112 and the thirteenth gear 113 of the fourth shaft 14, and that is engaged by an engagement stroke in a rotationally synchronized state without possessing a synchronization mechanism. When the first engagement clutch C1 is in a left engagement position (Left), the fourth shaft 14 and the thirteenth gear 113 are drivingly connected. When the first engagement clutch C1 is in a neutral position (N), the fourth shaft 14 and the twelfth gear 112 are released, and the fourth shaft 14 and the thirteenth gear 113 are released. When the first engagement clutch C1 is in a right engagement position (Right), the fourth shaft 14 and the twelfth gear 112 are drivingly connected.

The second engagement clutch C2 is a dog clutch that is interposed between the second gear 102 and the third gear 103 of the first shaft 11, and that is engaged by an engagement stroke in a rotationally synchronized state without possessing a synchronization mechanism. When the second engagement clutch C2 is in a left engagement position (Left), the first shaft 11 and the third gear 103 are drivingly connected. When the second engagement clutch C2 is in a neutral position (N), the first shaft 11 and the second gear 102 are released, and the first shaft 11 and the third gear 103 are released. When the second engagement clutch C2 is in a right engagement position (Right), the first shaft 11 and the second gear 102 are drivingly connected.

The third engagement clutch C3 is a dog clutch that is interposed between the ninth gear 109 and the tenth gear 110 of the third shaft 13, and that is engaged by an engagement stroke in a rotationally synchronized state without possessing a synchronization mechanism. When the third engagement clutch C3 is in a left engagement position (Left), the third shaft 13 and the tenth gear 110 are drivingly connected. When the third engagement clutch C3 is in a neutral position (N), the third shaft 13 and the ninth gear 109 are released, and the third shaft 13 and the tenth gear 110 are released. When the third engagement clutch C3 is in a right engagement position (Right), the third shaft 13 and the ninth gear 109 are drivingly connected. Then, a sixteenth gear 116 that meshes with the seventh gear 107 integrally provided (including integral attachment) to the third shaft 13 of the multistage gear transmission 1 is connected to left and right drive wheels 19 via the differential gear 17 and left and right drive shafts 18.

The control system of the hybrid vehicle comprises a hybrid control module 21, a motor control unit 22, a transmission control unit 23, and an engine control unit 24, as illustrated in FIG. 1.

The hybrid control module 21 (acronym: "HCM") is an integrated control means having a function to appropriately manage the energy consumption of the entire vehicle. This hybrid control module 21 is connected to the other control units (motor control unit 22, transmission control unit 23, engine control unit 24, etc.) so as to be capable of bidirectional information exchange via a CAN communication line 25. The "CAN" in CAN communication line 25 is an acronym for "Controller Area Network."

The motor control unit 22 (acronym: "MCU") carries out powering control, regeneration control and the like of the first motor/generator MG1 and the second motor/generator MG2 via control commands to the first inverter 4 and the second inverter 6. The control modes for the first motor/generator MG1 and the second motor/generator MG2 are "torque control" and "rotational speed FB control." In the "torque control," a control is carried out in which the actual motor torque is caused to follow a target motor torque, when a target motor torque to be shared with respect to a target drive force is determined. In the "rotational speed FB control," a control is carried out in which a target motor rotation speed, with which the input-output rotational speeds of the clutch are synchronized, is determined, and an FB torque is output so as to converge the actual motor rotation speed with the target motor rotation speed, when there is a gear shift request to meshing engagement of any one of the engagement clutches C1, C2, C3 during travel.

The transmission control unit 23 (acronym: "TMCU") carries out a shift control for switching the gear shift pattern of the multistage gear transmission 1, by outputting a current command to electric actuators 31, 32, 33 (refer to FIG. 2), based on predetermined input information. In this shift control, the engagement clutches C1, C2, C3 are selectively meshing-engaged/disengaged, and a gear pair involved in power transmission is selected from the plurality of pairs of gear pairs. Here, at the time of a gear shift request to engage any one of the released engagement clutches C1, C2, C3, in order to suppress differential rotation speed between the input-output of the clutch to ensure meshing engagement, a rotational speed FB control (rotation synchronization control) of the first motor/generator MG1 or the second motor/generator MG2 is used in combination.

The engine control unit 24 (acronym: "ECU") carries out start control of the internal combustion engine ICE, stop control of the internal combustion engine ICE, fuel cut control, and the like, by outputting a control command to the motor control unit 22, the spark plugs, fuel injection actuator, or the like, based on predetermined input information.

Configuration of the Shift Control System

The multistage gear transmission 1 according to the first embodiment is characterized in that efficiency is achieved by reducing drag by employing, as shifting elements, engagement clutches C1, C2, C3 (dog clutch) that are meshing engaged. Then, when there is a gear shift request to meshing engagement of any one of the engagement clutches C1, C2, C3, the differential rotation speeds of the input-output of the clutch are synchronized by the first motor/generator MG1 (when the engagement clutch C3 is engaged) or the second motor/generator MG2 (when the engagement clutches C1, C2 are engaged), and an engagement stroke is started once the rotational speed falls within a synchronization determination rotational speed range, to realize the gear shift. In addition, when there is a gear shift request to release any one of the engaged engagement clutches C1, C2, C3, the clutch transmission torque of the release clutch is reduced, and a disengagement stroke is started once the torque becomes less than or equal to a release torque determination value, to realize the gear shift. The configuration of the shift control system of the multistage gear transmission 1 is described below based on FIG. 2.

Figure 2:
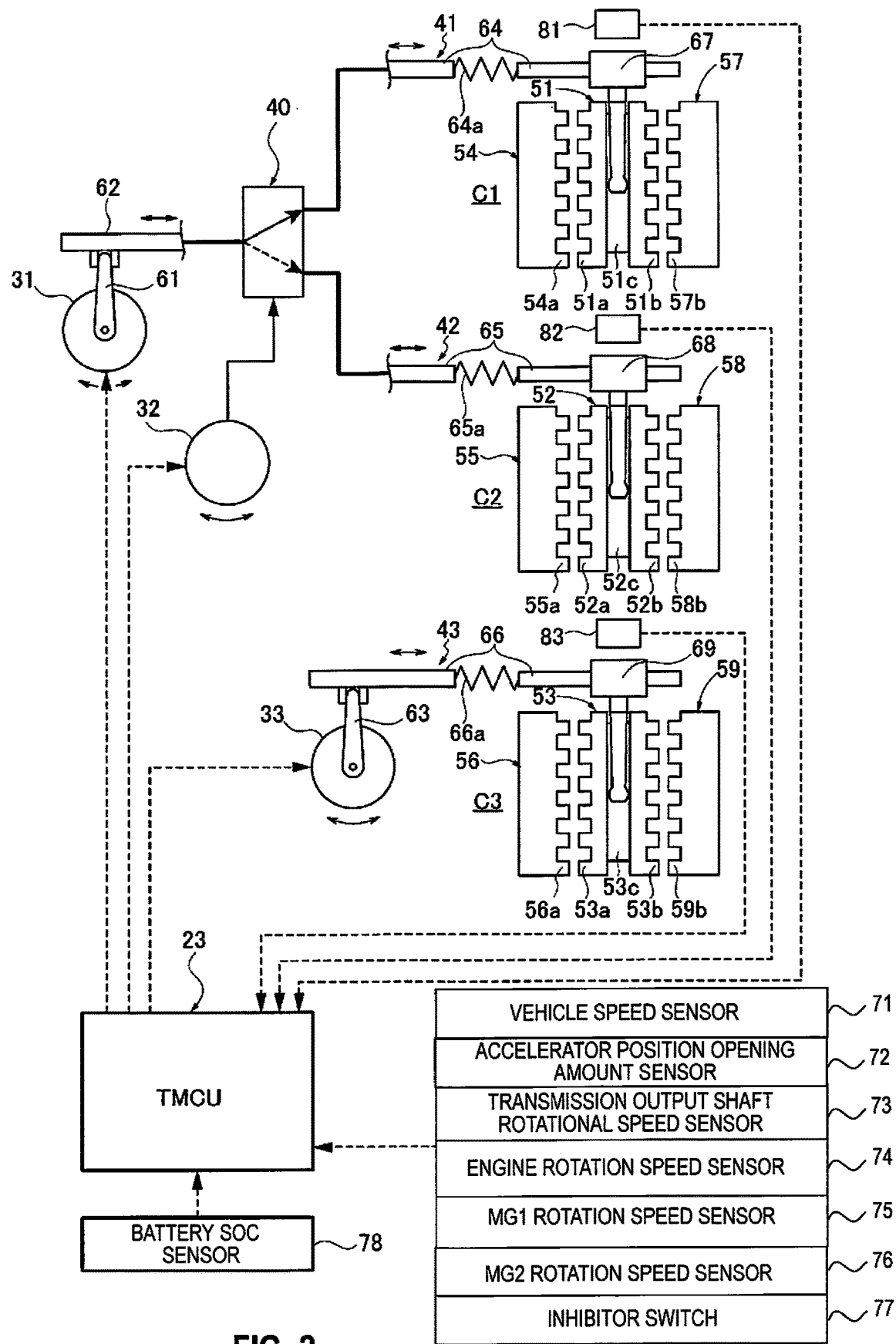
FIG. 2 is a control system block diagram illustrating the configuration of a shift control system of a multistage gear transmission mounted on a hybrid vehicle to which is applied the start control device of the first embodiment.

The shift control system comprises, as engagement clutches, a first engagement clutch C1, a second engagement clutch C2, and a third engagement clutch C3, as illustrated in FIG. 2. A first electric actuator 31 for a C1, C2 shift operation, a second electric actuator 32 for a C1, C2 select operation, and a third electric actuator 33 for a C3 shift operation, are provided as actuators. A C1/C2 select operation mechanism 40, a C1 shift operation mechanism 41, a C2 shift operation mechanism 42, and a C3 shift operation mechanism 43 are provided as shift mechanisms that convert actuator operations into clutch engagement/disengagement operations. Furthermore, a transmission control unit 23 is provided as a control means of the first electric actuator 31, the second electric actuator 32, and the third electric actuator 33.

The first engagement clutch C1, the second engagement clutch C2, and the third engagement clutch C3 are dog clutches that switch between a neutral position (N: disengaged position), a left engagement position (Left: left side clutch meshing-engagement position), and a right engagement position (Right: right side clutch meshing engagement position). The engagement clutches C1, C2, C3 all have the same configuration, comprising coupling sleeves 51, 52, 53, left dog clutch rings 54, 55, 56, and right dog clutch rings 57, 58, 59. The coupling sleeves 51, 52, 53 are provided so as to be strokable in the axial direction by a spline connection via a hub, which is not shown, fixed to the fourth shaft 14, the first shaft 11, and the third shaft 13, and have dog teeth 51a, 51b, 52a, 52b, 53a, 53b on both sides having flat top faces. Furthermore, fork grooves 51c, 52c, 53c are provided to the circumferential center portions of the coupling sleeves 51, 52, 53. The left dog clutch rings 54, 55, 56 are fixed to the boss portions of the gears 113, 103, 110, which are left idling gears of the engagement clutches C1, C2, C3, and have dog teeth 54a, 55a, 56a with flat top surfaces that oppose the dog teeth 51a, 52a, 53a. The right dog clutch rings 57, 58, 59 are fixed to the boss portions of the gears 112, 102, 109, which are right idling gears of the engagement clutches C1, C2, C3, and have dog teeth 57b, 58b, 59b with flat top surfaces that oppose the dog teeth 51b, 52b, 53b.

The C1/C2 select operation mechanism 40 is a mechanism for selecting between a first position for selecting a connection between the first electric actuator 31 and the C1 shift operation mechanism 41, and a second position for selecting a connection between the first electric actuator 31 and the C2 shift operation mechanism 42. When selecting the first position, a shift rod 62 and a shift rod 64 of the first engagement clutch C1 are connected, and a shift rod 65 of the second engagement clutch C2 is locked in the neutral position. When selecting the second position, a shift rod 62 and the shift rod 65 of the second engagement clutch C2 are connected, and the shift rod 64 of the first engagement clutch C1 is locked in the neutral position. That is, the mechanism is such that, when selecting a position from among the first position and the second position where one of the engagement clutches is shifted, the other engagement clutch is locked and fixed in the neutral position.

The C1 shift operation mechanism 41, the C2 shift operation mechanism 42, and the C3 shift operation mechanism 43 are mechanisms for converting the turning motions of the electric actuators 31, 33 into axial stroke motions of the coupling sleeves 51, 52, 53. The shift operating mechanisms 41, 42, 43 all have the same configuration, comprising turning links 61, 63, shift rods 62, 64, 65, 66, and shift forks 67, 68, 69. One end of each of the turning links 61, 63 is provided to the actuator shafts of the electric actuators 31, 33, respectively, and each of the other ends is connected to the shift rods 64 (or shift rod 65), 66, respectively, so as to be relatively displaceable. The shift rods 64, 65, 66 are configured to be capable of expanding and contracting as a function of the magnitude and the direction of the rod transmitting force, by means of springs 64a, 65a, 66a interposed in the rod dividing positions. One end of each of the shift forks 67, 68, 69 is fixed to the shift rods 64, 65, 66, respectively, and each of the other ends are respectively disposed in the fork grooves 51c, 52c, 53c of the coupling sleeves 51, 52, 53.

The transmission control unit 23 inputs sensor signals and switch signals from a vehicle speed sensor 71, an accelerator position opening amount sensor 72, a transmission output shaft rotational speed sensor 73, an engine rotation speed sensor 74, an MG1 rotation speed sensor 75, an MG2 rotation speed sensor 76, an inhibitor switch 77, a battery SOC sensor 78, and the like. The transmission output shaft rotation speed sensor 73 is provided to the shaft end portion of the third shaft 13 and detects the shaft rotation speed of the third shaft 13. Then, a position servo control unit (for example, a position servo system by PID control) is provided, which controls meshing-engagement and disengagement of the engagement clutches C1, C2, C3, determined by the positions of the coupling sleeves 51, 52, 53. The position servo control unit inputs sensor signals from a first sleeve position sensor 81, a second sleeve position sensor 82, and a third sleeve position sensor 83. Then, the sensor values of the sleeve position sensors 81, 82, 83 are read, and a current is imparted to the electric actuators 31, 32, 33 such that the positions of the coupling sleeves 51, 52, 53 will be in the disengaged position or the engagement position according to an engagement stroke. That is, by setting an engaged state in which the dog teeth welded to the coupling sleeves 51, 52, 53 and the dog teeth welded to the idling gears are both in engagement positions meshed with each other, the idling gears are drivingly connected to the fourth shaft 14, the first shaft 11, and the third shaft 13. On the other hand, by setting a disengaged state in which the dog teeth welded to the coupling sleeves 51, 52, 53 and the dog teeth welded to the idling gears are in non-engagement positions by displacement of the coupling sleeves 51, 52, 53 in the axial direction, the idling gears are disconnected from the fourth shaft 14, the first shaft 11, and the third shaft 13.

Configuration of the Gear Shift Stages

The multistage gear transmission 1 of the first embodiment features size reduction achieved by reducing the power transmission loss without possessing a differential rotation absorbing element, such as a fluid coupling, and by reducing the gear shift stages of the ICE by providing a motor assist to the internal combustion engine ICE (EV gear shift stages: 1-2 speed, ICE gear shift stages: 1-4 speed). The configuration of the gear shift stages of the multistage gear transmission 1 is described below based on FIG. 3 and FIG. 4.

Figure 3:
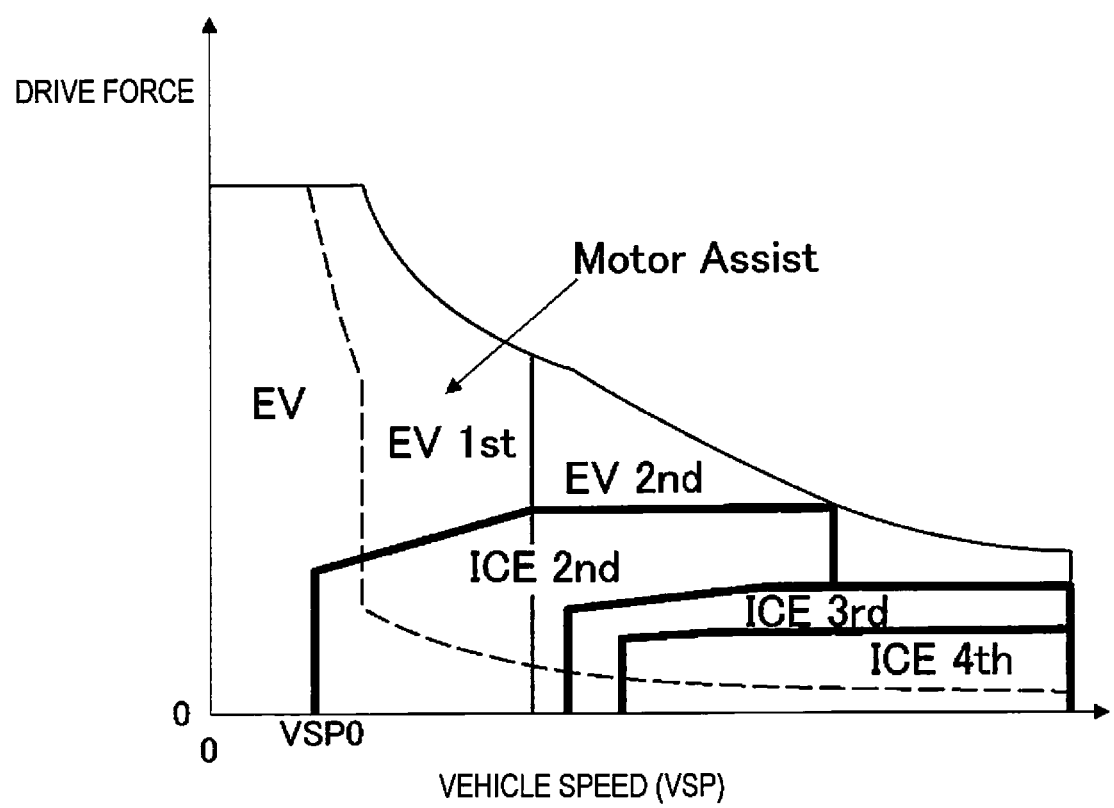
FIG. 3 is a schematic overview of a shift map illustrating a concept of switching the gear shift stage in a multistage gear transmission mounted on a hybrid vehicle to which is applied the start control device of the first embodiment.

A concept of the gear shift stages is employed in which, when the vehicle speed VSP is in a starting region that is less than or equal to a predetermined vehicle speed VSP0, since the multistage gear transmission 1 does not have a starting element (slipping element), a motor start by only the motor driving force is carried out in the "EV mode," as illustrated in FIG. 3. Then, when in the traveling region and the demand for driving force is great, a "parallel HEV mode" is employed in which the engine driving force is assisted by the motor driving force, as illustrated in FIG. 3. That is, as the vehicle speed VSP increases, the ICE gear shift stages shift from (ICE 1st)→ICE 2nd→ICE 3rd→ICE 4th, and the EV gear shift stages shift from EV 1st→EV 2nd. Therefore, based on the concept of the gear shift stages illustrated in FIG. 3, a shift map for issuing gear shift requests for switching the gear shift stage is created.

All of the gear shift stages achievable by the multistage gear transmission 1 having engagement clutches C1, C2, C3 are as shown in FIG. 4. In FIG. 4, "Lock" represents an interlock gear shift stage that is not applicable as a gear shift stage, "EV-" represents a state in which the first motor/generator MG1 is not drivingly connected to the driving wheels 19, and "ICE-" represents a state in which the internal combustion engine ICE is not drivingly connected to the driving wheels 19. Each of the gear shift stages is described below.

When the second engagement clutch C2 is "N" and the third engagement clutch C3 is "N," the following gear shift stages are obtained according to the position of the first engagement clutch C1. "EV-ICE gen" is obtained if the first engagement clutch C1 is "Left," "Neutral" is obtained if the first engagement clutch C1 is "N," and "EV-ICE 3rd" is obtained if the first engagement clutch C1 is "Right." Here, the gear shift stage "EV-ICE gen" is a gear shift stage selected at the time of MG1 idle power generation, in which power is generated in the first motor/generator MG1 by the internal combustion engine ICE when the vehicle is stopped, or, at the time of double idle power generation, in which MG2 power generation is carried out in addition to MG1 power generation. The gear shift stage "Neutral" is a gear shift stage selected at the time of MG2 idle power generation, in which power is generated in the second motor/generator MG2 by the internal combustion engine ICE when the vehicle is stopped.

When the second engagement clutch C2 is "N" and the third engagement clutch C3 is "Left," the following gear shift stages are obtained according to the position of the first engagement clutch C1. "EV 1st ICE 1st" is obtained if the first engagement clutch C1 is "Left," "EV 1st ICE-" is obtained if the first engagement clutch C1 is "N," and "EV 1st ICE 3rd" is obtained if the first engagement clutch C1 is "Right." Here, the gear shift stage "EV 1st ICE-" is a gear shift stage selected when in the "EV mode" in which the internal combustion engine ICE is stopped and travel is carried out by the first motor/generator MG1, or, in the "series HEV mode" in which a first-speed EV travel is carried out by the first motor/generator MG1 while power is generated in the second motor/generator MG2 by the internal combustion engine ICE.

When the second engagement clutch C2 is "Left" and the third engagement clutch C3 is "Left," "EV 1st ICE 2nd" is obtained if the position of the first engagement clutch C1 is "N." When the second engagement clutch C2 is "Left" and the third engagement clutch C3 is "N," the following gear shift stages are obtained according to the position of the first engagement clutch C1. "EV 1.5 ICE 2nd" is obtained if the first engagement clutch C1 is "Left," and "EV-ICE 2nd" is obtained if the first engagement clutch C1 is "N." When the second engagement clutch C2 is "Left" and the third engagement clutch C3 is "Right," "EV 2nd ICE 2nd" is obtained if the position of the first engagement clutch C1 is "N."

When the second engagement clutch C2 is "N" and the third engagement clutch C3 is "Right," the following gear shift stages are obtained according to the position of the first engagement clutch C1. "EV 2nd ICE 3rd" is obtained if the first engagement clutch C1 is "Left," "EV 2nd ICE-" is obtained if the first engagement clutch C1 is "N," and "EV 2nd ICE 3rd" is obtained if the first engagement clutch C1 is "Right." Here, the gear shift stage "EV 2nd ICE-" is a gear shift stage selected when in the "EV mode" in which the internal combustion engine ICE is stopped and travel is carried out by the first motor/generator MG1, or, in the "series HEV mode" in which a second-speed EV traveling is carried out by the first motor/generator MG1 while power is generated in the second motor/generator MG2 by the internal combustion engine ICE.

When the second engagement clutch C2 is "Right" and the third engagement clutch C3 is "Right," "EV 2nd ICE 4th" is obtained if the position of the first engagement clutch C1 is "N." When the second engagement clutch C2 is "Right" and the third engagement clutch C3 is "N," the following gear shift stages are obtained according to the position of the first engagement clutch C1. "EV 2.5 ICE 4th" is obtained if the first engagement clutch C1 is "Left," and "EV-ICE 4th" is obtained if the first engagement clutch C1 is "N." When the second engagement clutch C2 is "Right" and the third engagement clutch C3 is "Left," "EV 1st ICE 4th" is obtained if the position of the first engagement clutch C1 is "N."

Described next is a method to separate the "normal use gear shift stage" from all the above-described gear shift stages achieved by engagement combinations of the engagement clutches C1, C2, C3. First, gear shift stages excluding the "interlock gear shift stages (cross hatching in FIG. 4)" and "gear shift stages that cannot be selected by the shift mechanism (right-up hatching in FIG. 4)" from all the gear shift stages shall be the plurality of gear shift stages that can be achieved by the multistage gear transmission 1. Here, gear shift stages that cannot be selected by the shift mechanism refer to "EV 1.5 ICE 2nd" in which the first engagement clutch C1 is "Left" and the second engagement clutch C2 is "Left," and "EV 2.5 ICE 4th" in which the first engagement clutch C1 is "Left" and the second engagement clutch C2 is "Right." The reason that these gear shift stages cannot be selected by the shift mechanism is that one first electric actuator 31 is a shift actuator that is shared for use with two engagement clutches C1, C2, and that one of the engagement clutches is neutral locked by the C1/C2 select operation mechanism 40.

Then, gear shift stages excluding the "gear shift stages not normally used (right-down hatching in FIG. 4)" and "gear shift stages used with low SOC, etc. (dashed line frame in FIG. 4)" from the plurality of gear shift stages that can be achieved by the multistage gear transmission 1 shall be the "normal use gear shift stage (thick line frame in FIG. 4)." Here, the "gear shift stages not normally used" are "EV 2nd ICE 3rd" and "EV 1st ICE 4th," and the "gear shift stages used with low SOC, etc." are "EV-ICE gen" and "EV 1st ICE 1st."

Therefore, "normal use gear shift stages" are configured by adding "Neutral" to EV gear shift stages (EV 1st, ICE-, EV 2nd ICE-), ICE gear shift stages (EV-ICE 2nd, EV-ICE 3rd, EV-ICE 4th), and combination gear shift stages (EV 1st ICE 2nd, EV 1st ICE 3rd, EV 2nd ICE 2nd, EV 2nd ICE 3rd, EV 2nd ICE 4th).

Detailed Configuration of the C1/C2 Select Operation Mechanism

Figure 5:
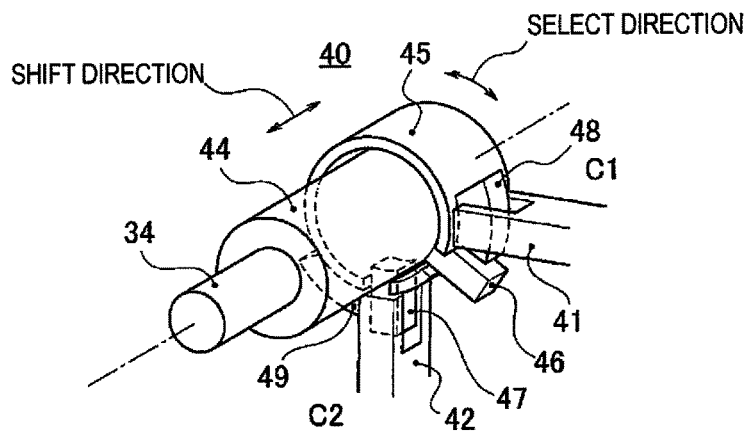
FIG. 5 is a perspective view illustrating the selected state of the first position in the C1/C2 select operation mechanism of the first embodiment.
Figure 6:
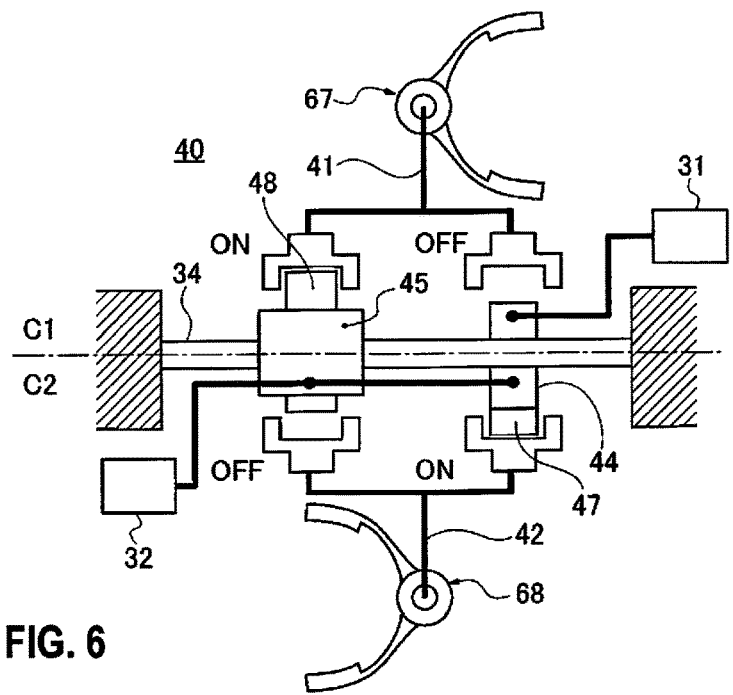
FIG. 6 is a schematic diagram illustrating the selected state of the first position in the C1/C2 select operation mechanism of the first embodiment.
Figure 7:
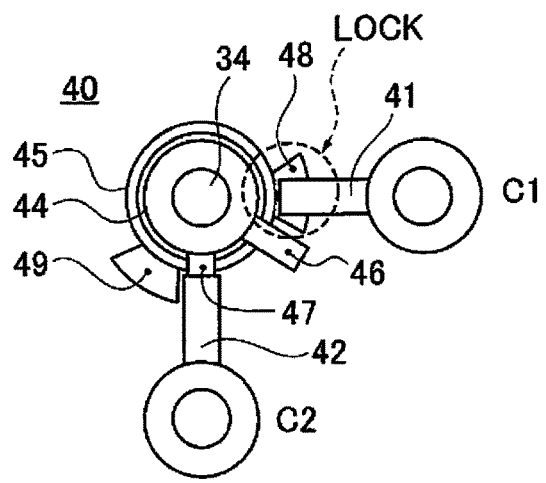
FIG. 7 is an axial view in the direction of the arrow illustrating the selected state of the first position in the C1/C2 select operation mechanism of the first embodiment.
Figure 8:
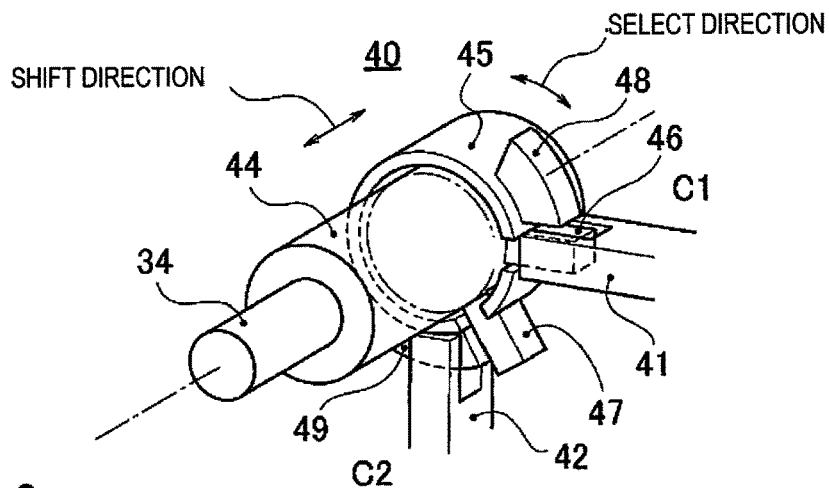
FIG. 8 is a perspective view illustrating the selected state of the second position in the C1/C2 select operation mechanism of the first embodiment.
Figure 9:
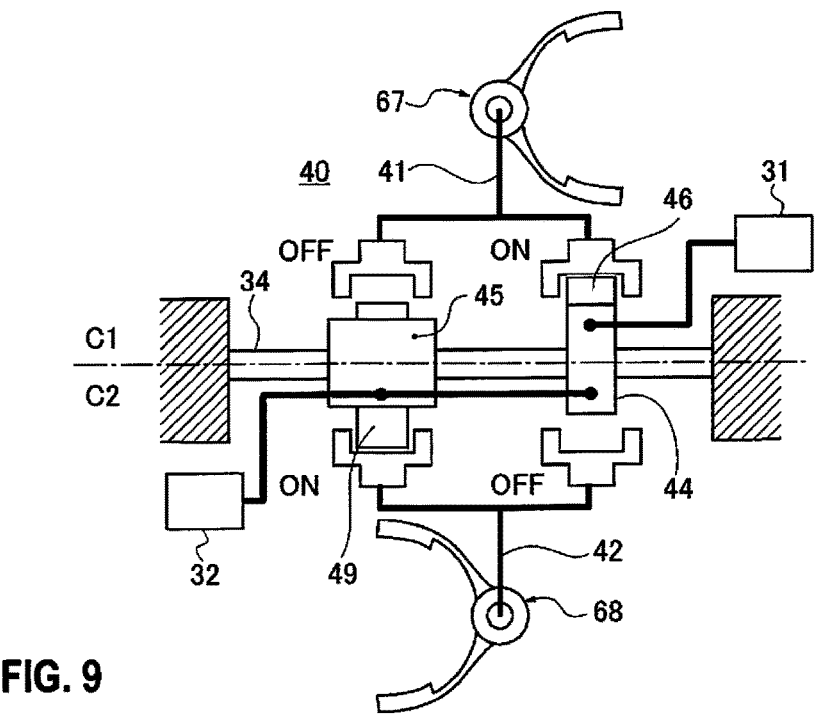
FIG. 9 is a schematic explanatory view illustrating the selected state of the second position in the C1/C2 select operation mechanism of the first embodiment.
Figure 10:
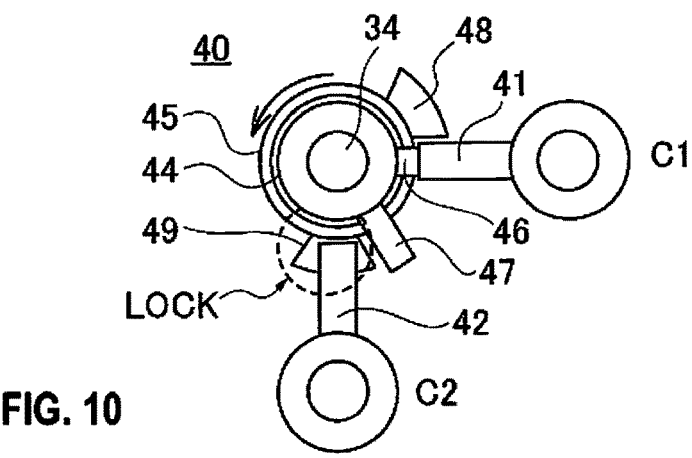
FIG. 10 is an axial view illustrating the selected state of the second position in the C1/C2 select operation mechanism of the first embodiment.

FIG. 5-FIG. 7 illustrate the selected state of the first position in which the C1/C2 select operation mechanism 40 permits the shift operation of the first engagement clutch C1, and FIG. 8-FIG. 10 illustrate the selected state of the second position in which the C1/C2 select operation mechanism 40 permits the shift operation of the second engagement clutch C2. The detailed configuration of the C1/C2 select operation mechanism 40 will be described below based on FIG. 5-FIG. 10.

The C1/C2 select operation mechanism 40 is provided with a movable shaft 44 at an outer circumferential position of a case fixing shaft 34 and also with a movable ring 45 at an outer circumferential position of the movable shaft 44, as illustrated in FIG. 5. The movable shaft 44 can be turned in a select direction by the second electric actuator 32, and has freedom of movement of operation in the select direction (=direction of rotation). The movable ring 45 has freedom of movement in the select direction (=direction of rotation) in conjunction with the movable shaft 44, and also has freedom of movement in a shift direction (=axial direction) by the first electric actuator 31.

A first neutral lock pin 46 and a second neutral lock pin 47 are provided to the movable shaft 44 so as to protrude in the radial direction, in positions that are separated in the circumferential direction by a predetermined angle (<90°). The first neutral lock pin 46 is a pin for locking the C1 shift operation mechanism 41 in the neutral position when selecting the second position. The second neutral lock pin 47 is a pin for locking the C2 shift operation mechanism 42 in the neutral position when selecting the first position.

Pin grooves are formed in the movable ring 45 with which the first neutral lock pin 46 and the second neutral lock pin 47 engage in the circumferential direction, with a stroke margin. In addition, a first connecting lock pin 48 and a second connecting lock pin 49 are provided to the movable ring 45 so as to protrude in the radial direction, in positions that are separated in the circumferential direction by a predetermined angle (>90°). The first connecting lock pin 48 is a pin that is locked at the connecting position with the C1 shift operation mechanism 41 when selecting the first position. The second mesh connecting lock pin 49 is a pin that is locked at the connecting position with the C2 shift operation mechanism 42 when selecting the second position. The first neutral lock pin 46 is disposed in an interior side position of the first connecting lock pin 48, and the second neutral lock pin 47 is disposed in an interior side position of the second connecting lock pin 49.

When the first position is selected by the second electric actuator 32 for the C1, C2 select operation, the movable ring 45 and the C1 shift operation mechanism 41 are connected via the first connecting lock pin 48, as illustrated in FIG. 5-FIG. 7 (upper left ON portion in FIG. 6, LOCK portion in FIG. 7). Therefore, by operating the first electric actuator 31 for the C1, C2 shift operation, the shift operation of the first engagement clutch C1 is permitted via the C1 shift operation mechanism 41 and the shift fork 67. At the same time, when the first position is selected by the second electric actuator 32 for the C1, C2 select operation, the movable shaft 44 and the C2 shift operation mechanism 42 are connected via the second neutral lock pin 47 (lower right ON portion in FIG. 6). Therefore, the shift operation of the C2 shift operation mechanism 42 and the shift fork 68 is inhibited, and the second engagement clutch C2 is locked in the neutral position.

When the second position is selected by the second electric actuator 32 for the C1, C2 select operation, the movable ring 45 and the C2 shift operation mechanism 42 are connected via the second connecting lock pin 49, as illustrated in FIG. 8-FIG. 10 (lower left ON portion in FIG. 9, LOCK portion in FIG. 10). Therefore, by operating the first electric actuator 31 for the C1, C2 shift operation, the shift operation of the second engagement clutch C2 is permitted via the C2 shift operation mechanism 42 and the shift fork 68. At the same time, when the second position is selected by the second electric actuator 32 for the C1, C2 select operation, the movable shaft 44 and the C1 shift operation mechanism 41 are connected via the first neutral lock pin 46 (upper right ON portion in FIG. 9). Therefore, the shift operation of the C1 shift operation mechanism 41 and the shift fork 67 is inhibited, and the first engagement clutch C1 is locked in the neutral position.

Configuration of the Starting Control Process

Figure 11:
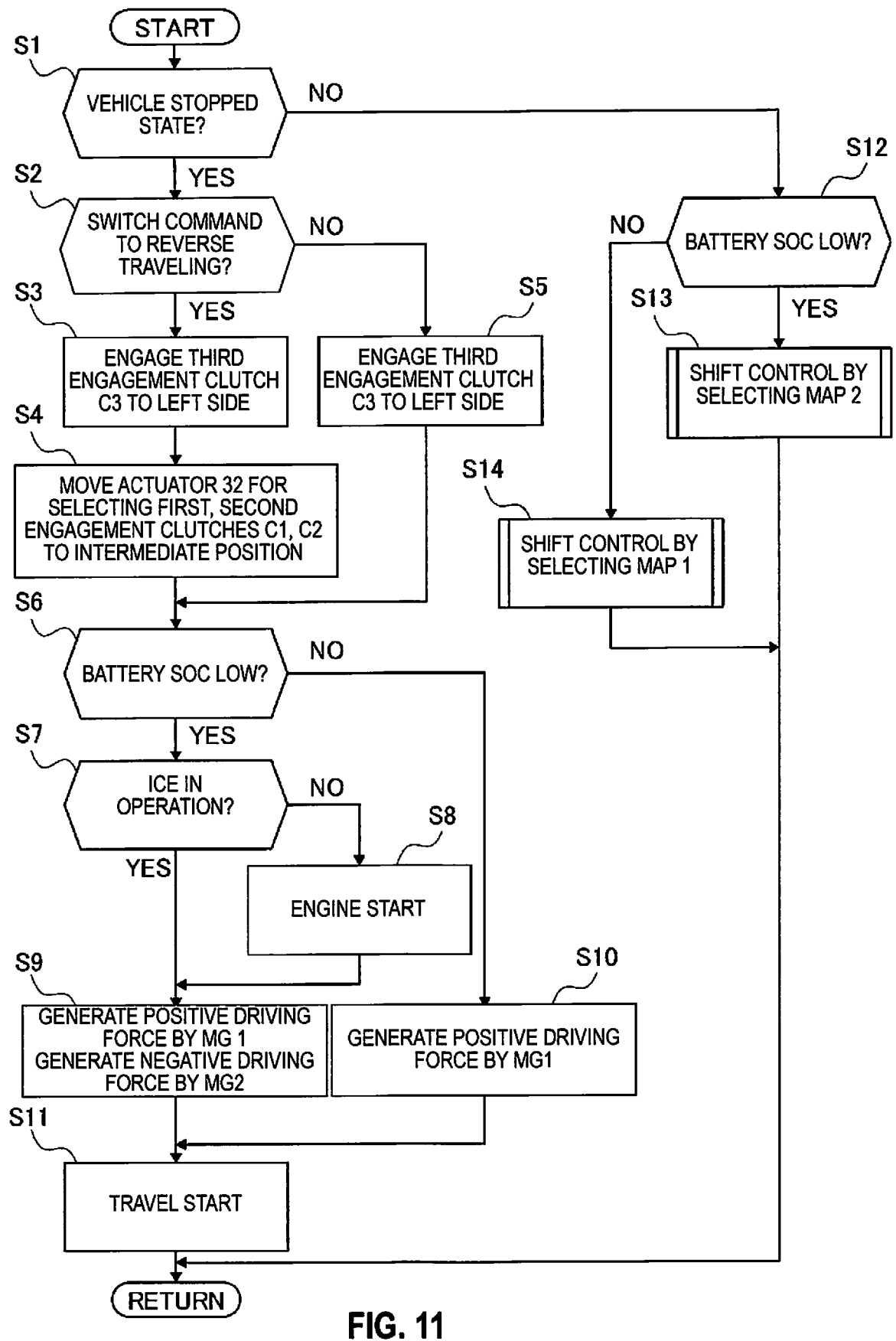
FIG. 11 is a flowchart illustrating the flow of starting control steps carried out in a transmission control unit of the first embodiment.

FIG. 11 illustrates the sequence of the starting control process executed by the transmission control unit 23 (starting controller) of the first embodiment. Each of the steps in FIG. 11, which shows one example of the configuration of the starting control process, will be described below.

In Step S1, it is determined whether or not the vehicle is in a stopped state. If YES (vehicle stopped state), the steps proceed to Step S2, and if NO (vehicle traveling state), the steps proceed to Step S12. Here, a "vehicle stopped state" is determined when the vehicle speed VSP is zero, and a vehicle stop condition is established, such as during a brake pedal depression operation.

In Step S2, following the determination of a vehicle stopped state in Step S1, the presence/absence of a switch command to reverse traveling is determined. If YES (at the time of R range selection operation), the steps proceed to Step S3, and if NO (at the time of D range selection operation), the steps proceed to Step S5. Here, the determination of the presence/absence of a switch command to reverse traveling is carried out based on a switch signal from the inhibitor switch 77, and it is determined that a switch command to reverse traveling is present if a selection operation from the N range to the R range is detected.

In Step S3, following the determination that it is at the time of the R range selection operation in Step S2, the third engagement clutch C3 is engaged by being caused to stroke to the left side (Left) by a command to the third actuator 33, and the steps proceed to Step S4. Here, by an engagement of the third engagement clutch C3 to the left side (Left), "EV 1$^{st}$," which is the EV first gear stage, is selected in the multistage gear transmission 1.

In Step S4, following the left side engagement of the third engagement clutch C3 in Step S3, the operational position of the C1/C2 select operation mechanism 40 for selecting the first and the second engagement clutches C1, C2 is moved to an intermediate position between the first position and the second position, and the steps proceed to Step S6. Here, the "first position" is a position in which the C1/C2 select operation mechanism 40 permits the shift operation of the first engagement clutch C1 (FIG. 5-FIG. 7). The "second position" is a position in which the C1/C2 select operation mechanism 40 permits the shift operation of the second engagement clutch C2 (FIG. 8-FIG. 10). In contrast, the "intermediate position" is a neutral lock position in which the C1/C2 select operation mechanism 40 fixes the first engagement clutch C1 and the second engagement clutch C2 in the neutral position. That is, the intermediate position is a position in which the shift operation of the first engagement clutch C1 and the second engagement clutch C2 from the neutral position is inhibited, even when attempting a shift stroke by the first electric actuator 31.

In Step S5, following the determination that it is at the time of the D range selection operation in Step S2, the third engagement clutch C3 is engaged by being caused to stroke to the left side (Left) by a command to the third actuator 33, and the steps proceed to Step S6. Here, by an engagement of the third engagement clutch C3 to the left side (Left), "EV 1st", which is the EV first gear stage, is selected in the multistage gear transmission 1.

In Step S6, following the movement of the operating position of the C1/C2 select operation mechanism 40 to the intermediate position in Step S4, or the left side engagement of the third engagement clutch C3 in Step S5, it is determined whether or not the battery SOC is low. If YES (low battery SOC), the steps proceed to Step S7, and if NO (high battery SOC), the steps proceed to Step S10. Here, information on the "battery SOC" is acquired based on a sensor signal from the battery SOC sensor 78. Whether or not the battery SOC is low is determined by previously determining a battery SOC threshold that separates a low SOC region requiring power generation and a high SOC region requiring no power generation, and when the battery SOC is less than or equal to the battery SOC threshold, the battery SOC is determined to be low.

In Step S7, following a low battery SOC determination in Step S6, it is determined whether or not the internal combustion engine ICE is in operation. If YES (ICE in operation), the steps proceed to. Step S9, and if NO (ICE stopped), the steps proceed to Step S8. Here, "ICE in operation" is determined when, for example, with the establishment of an idle power generation condition in a vehicle stopped state, the internal combustion engine ICE is operated, and idle power generation for generating power is being carried out by at least one of the first motor/generator MG1 and the second motor/generator MG2.

In Step S8, following an ICE stopped determination in Step S7, the internal combustion engine ICE is started using the second motor/generator MG2 as the starter motor, and the steps proceed to Step S9.

Figure 12:
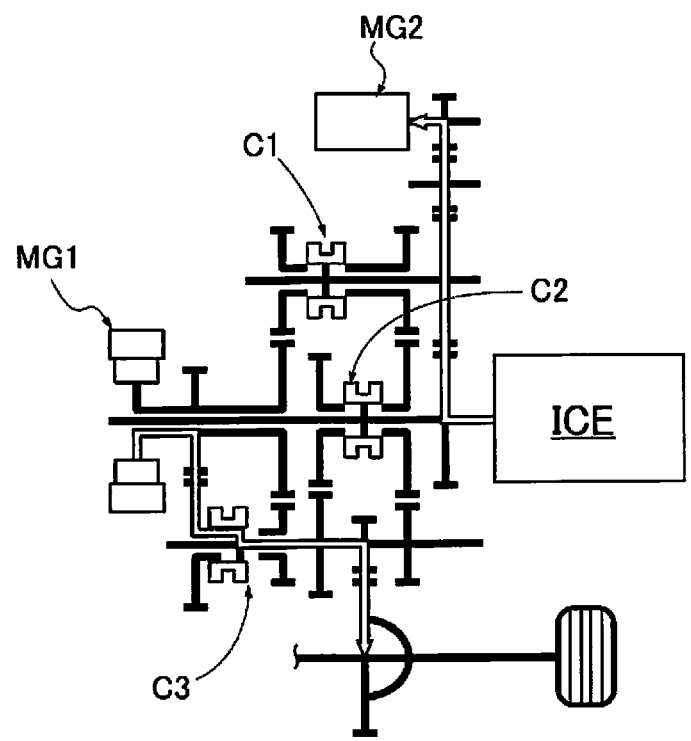
FIG. 12 is a torque flow diagram illustrating the flow of the MG1 torque and the engine torque in a multistage gear transmission when selecting the "series HEV mode" for starting in "EV1st," in which the first motor/generator MG1 is the drive source, while generating power with the second motor/generator MG2 by the drive of the internal combustion engine ICE.
Figure 13:
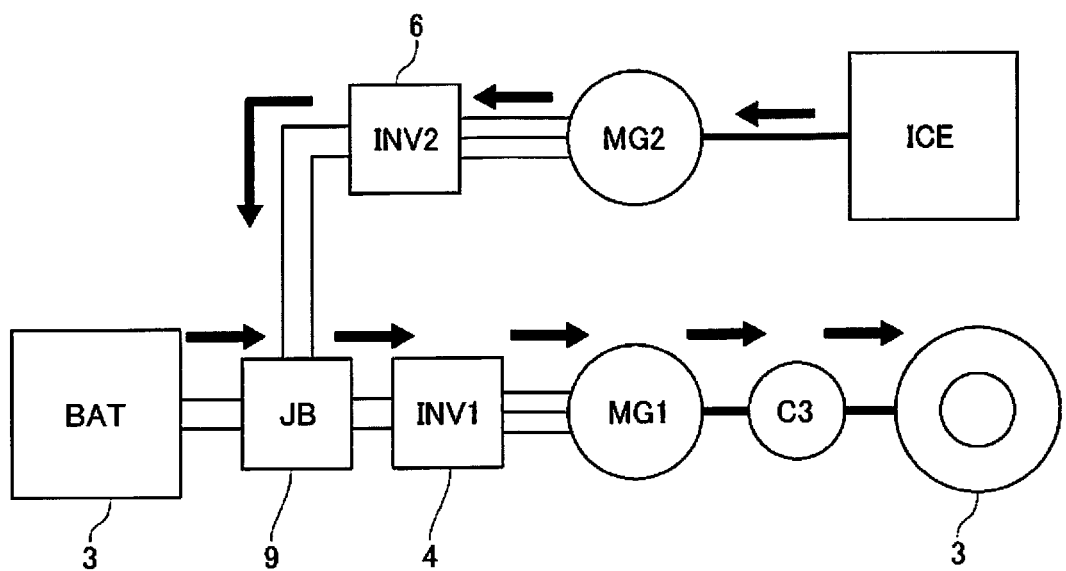
FIG. 13 is an energy flow diagram illustrating the flow of energy when starting with the "series HEV mode" selected.

In Step S9, following an ICE in operation determination in Step S7, or an engine start in Step S8, a positive driving force is generated by the first motor/generator MG1 and a negative driving force (power generation) is generated by the second motor/generator MG2, and the steps proceed to Step S11. Here, if an MG1 positive driving force and an MG2 negative driving force are generated, the "series HEV mode" is selected, in which an EV first speed start is carried out with the first motor/generator MG1 as the drive source, while power is generated in the second motor/generator MG2 by the internal combustion engine ICE, as illustrated in FIG. 12. At this time, the first motor/generator MG1 is driven using the generated power from the second motor/generator MG2 and the battery power from the high-power battery 3, and the power consumption of the high-power battery 3 is reduced, as illustrated in FIG. 13.

In Step S10, following a high battery SOC determination in Step S6, a positive driving force is generated by the first motor/generator MG1, and the steps proceed to Step S11. Here, with the generation of an MG1 positive driving force, the "EV mode" is selected, in which an EV first speed start is carried out with the first motor/generator MG1 as the drive source.

In Step S11, following the generation of an MG1 positive driving force and an MG2 negative driving force in Step S9, or the generation of an MG1 positive driving force is Step S10, traveling by an EV reverse starting is started according to an accelerator operation at the time of an R range selection operation, and traveling by an EV forward starting is started according to an accelerator operation at the time of a D range selection operation, and the steps proceed to Return. Here, at the time of the D range selection operation, the first motor/generator MG1 is rotated in the same direction as the direction of rotation of the internal combustion engine ICE. On the other hand, at the time of the R range selection operation, the first motor/generator MG1 is rotated in the direction opposite to the direction of rotation of the internal combustion engine ICE.

In Step S12, following a determination of a vehicle traveling state in Step S1, it is determined whether or not the battery SOC is low. If YES (low battery SOC), the steps proceed to Step S13, and if NO (high battery SOC), the steps proceed to Step S14. Here, information on the "battery SOC" is acquired based on a sensor signal from the battery SOC sensor 78. Whether or not the battery SOC is low is determined by previously determining a battery SOC threshold that separates a low SOC region requiring power generation and a high SOC region requiring no power generation, and when the battery SOC is less than or equal to the battery SOC threshold, the battery SOC is determined to be low.

Figure 14:
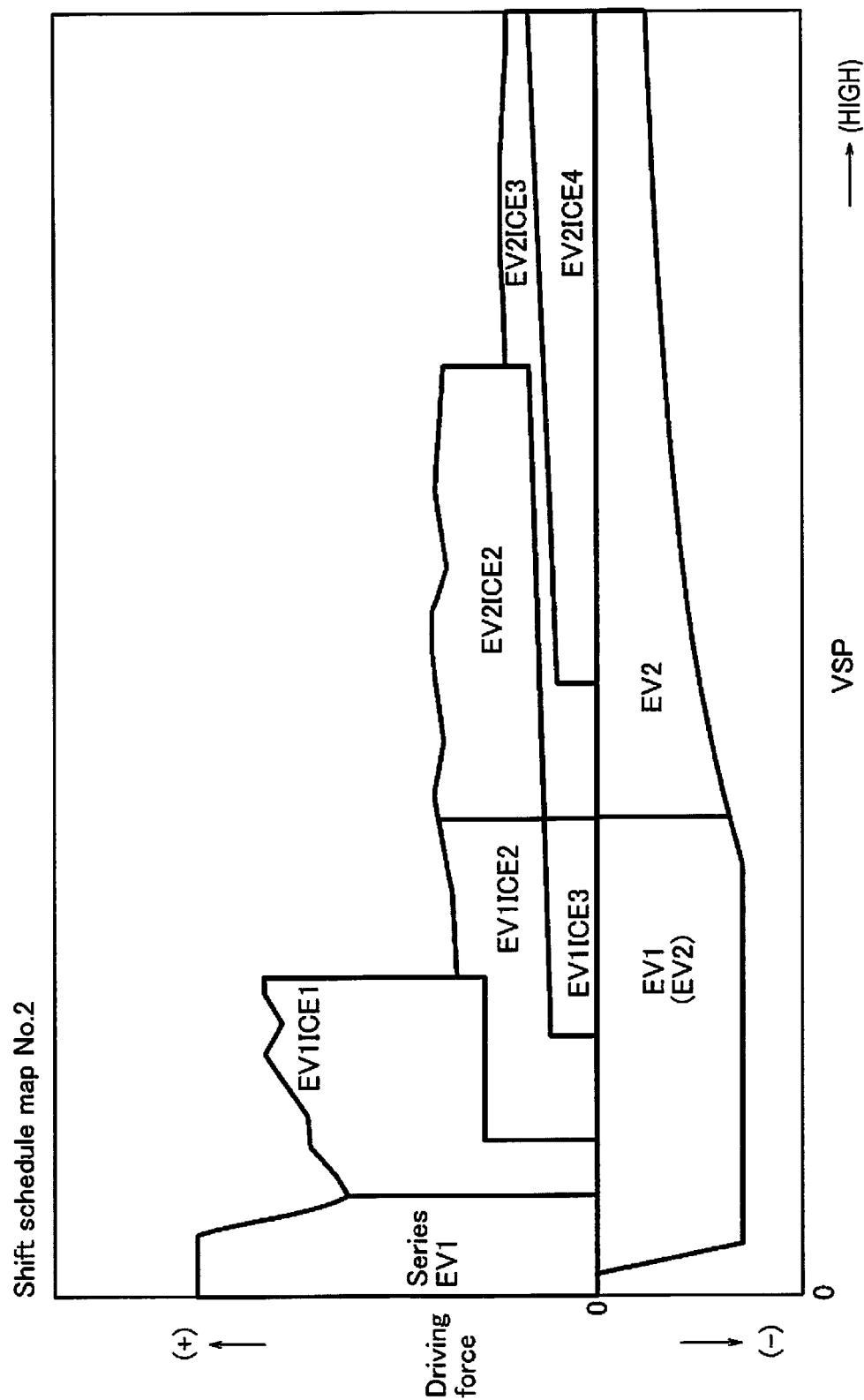
FIG. 14 is a second shift schedule map illustrating the switching region of the gear shift stage that is selected during travel when the battery SOC is in a low SOC region.

In Step S13, following a low battery SOC determination in Step S12, a shift control is carried out by selecting the second shift schedule map illustrated in FIG. 14, and the steps proceed to Return. The "second shift schedule map" used in the shift control at the time of low SOC is a map in which the vehicle speed VSP and the required braking/driving force (Driving force) are the coordinate axes, and in the coordinate plane thereof there is assigned a selection region for selecting a gear shift stage obtained by adding "EV 1st ICE 1st" to the normal use gear shift stage, as shown in FIG. 14. That is, a selection region of "Series EV 1st" is assigned to the low vehicle speed region after start, as a driving region by an accelerator pedal depression. Then, the selection regions of "EV 1st ICE 1st," "EV 1st ICE 2nd," and "EV 1st ICE 3rd" are assigned to the intermediate vehicle speed region, and the selection regions of "EV 2nd ICE 2nd," "EV 2nd ICE 3rd," and "EV 2nd ICE 4th" are assigned to the high vehicle speed region. As coasting regenerative braking regions with the foot away from the accelerator pedal, the selection region of "EV 1st (EV 2nd)" is assigned to the low vehicle speed region, and the selection region of "EV 2nd" is assigned to the high vehicle speed region.

Figure 15:
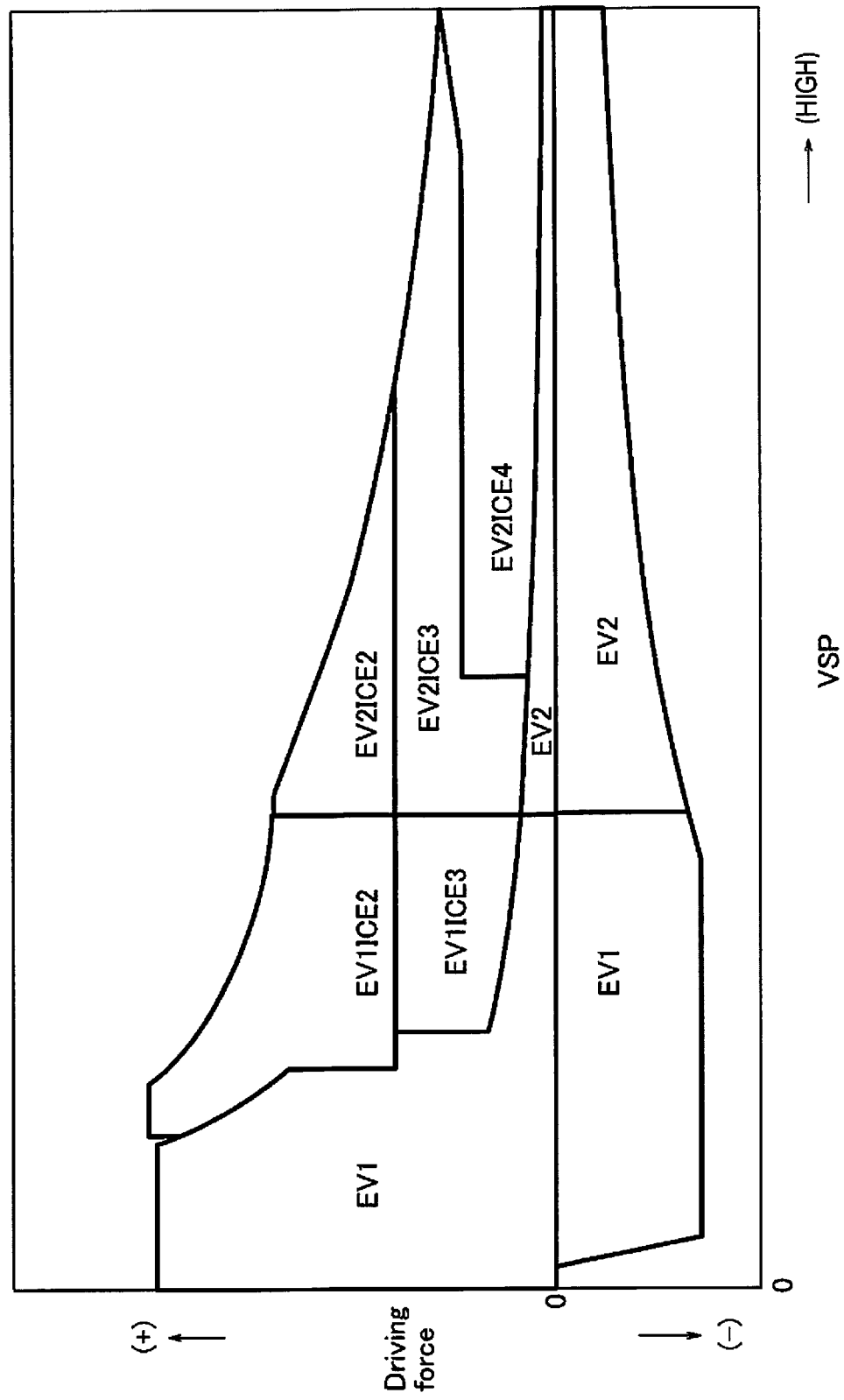
FIG. 15 is a first shift schedule map illustrating the switching region of the gear shift stage that is selected during travel when the battery SOC is in a normal capacity region, excluding the low SOC region and the high SOC region.

In Step S14, following a high battery SOC determination in Step S12, a shift control is carried out by selecting the first shift schedule map illustrated in FIG. 15; and the steps proceed to Return. The "first shift schedule map" used in the shift control at the time of high SOC is a map in which the vehicle speed VSP and the required braking/driving force (Driving force) are the coordinate axes, and in the coordinate plane thereof there is assigned a selection region for selecting a plurality of gear shift stages that constitute a normal use gear shift stage group, as shown in FIG. 15. That is, a selection region of "EV 1st" is assigned to the low vehicle speed region after start, as a driving region by an accelerator pedal depression. Then, the selection regions of "EV 2nd," "EV 1st ICE 2nd," "EV 1st ICE 3rd," "EV 2nd ICE 2nd," "EV 2nd ICE 3rd," and "EV 2nd ICE 4th" are assigned to the intermediate to high vehicle speed region. As coasting regenerative braking regions with the foot away from the accelerator pedal, the selection region of "EV 1st" is assigned to the low vehicle speed region, and the selection region of "EV 2nd" is assigned to the intermediate to high vehicle speed region.

Next, the actions are described. The "action of the starting control process," "action of the starting control," and the "characteristic action of the starting control" will be described separately, regarding the actions of the start control device for a hybrid vehicle according to the first embodiment.

Action of the Starting Control Process

Below, the action of the starting control process from a vehicle stopped state is separated into an EV forward starting action at a high SOC, an EV forward starting action at a low SOC, an EV reverse starting action at a high SOC, and an EV reverse starting action at a low SOC, which are described based on the flowchart illustrated in FIG. 11.

EV Forward Starting Action at a High SOC

At the time of EV forward starting at a high SOC, the steps proceed from Step S1→Step S2→Step S5→Step S6→Step S10→Step S11→Return, in the flowchart of FIG. 11. That is, if it is determined that it is at the time of the D range selection operation in Step S2, the steps proceed to Step S5, and in Step S5, the first gear stage of the EV gear shift stage is selected by stroking and engaging the third engagement clutch C3 to the left side (Left) by a command to the third electric actuator 33. If a high battery SOC is determined in the subsequent Step S6, the steps proceed to Step S10, and a positive driving force is generated by the first motor/generator MG1. Therefore, in the subsequent Step S11, an EV forward starting is carried out by the EV first gear stage, with the first motor/generator MG1 as the drive source. When EV traveling is started by an EV forward starting in the "EV mode," the steps that progress from Step S1→Step S12→Step S14→Return in the flowchart of FIG. 11 are repeated. As long as a high battery SOC is maintained in this forward traveling state, in Step S14, a shift control is carried out by selecting the first shift schedule map illustrated in FIG. 15. If the battery SOC transitions to a low SOC state during forward traveling, steps that progress from Step S1→Step S12→Step S13→Return in the flowchart of FIG. 11 are repeated, and a shift control is carried out by selecting the second shift schedule map illustrated in FIG. 14.

EV Forward Starting Action at a Low SOC

At the time of EV forward starting at a low SOC, the steps proceed from Step S1→Step S2→Step S5→Step S6→Step S7→(Step S8→) Step S9→Step S11→Return, in the flowchart of FIG. 11. That is, if it is determined that it is at the time of the D range selection operation in Step S2, the steps proceed to Step S5, and in Step S5, the first gear stage of the EV gear shift stage is selected by stroking and engaging the third engagement clutch C3 to the left side (Left) by a command to the third electric actuator 33. If a low battery SOC is determined in the subsequent Step S6, the steps proceed to Step S7 and it is determined whether or not the internal combustion engine ICE is in operation; if ICE is in operation, the steps proceed directly to Step S9, and if ICE is stopped, the engine is started in Step S8 and the steps proceed to Step S9. In Step S9, a positive driving force is generated by the first motor/generator MG1 and a negative driving force is generated by the second motor/generator MG2. Therefore, in the subsequent Step S11, an EV forward starting is carried out by the EV first gear stage, with the first motor/generator MG1 as the drive source, while generating power by the second motor/generator MG2. When EV traveling is started by an EV forward starting in the "series HEV mode," the steps that progress from Step S1→Step S12→Step S13→Return in the flowchart of FIG. 11 are repeated. As long as a low battery SOC is maintained in this forward traveling state, in Step S13, a shift control is carried out by selecting the second shift schedule map illustrated in FIG. 14. If the battery SOC transitions to a high SOC state during forward traveling, the steps that proceed from Step S1→Step S12→Step S14→Return in the flowchart of FIG. 11 are repeated, and a shift control is carried out by selecting the first shift schedule map illustrated in FIG. 15.

EV Reverse Starting Action at a High SOC

At the time of EV reverse starting at a high SOC, the steps proceed from Step S1→Step S2→Step S3→Step S4→Step S6→Step S10→Step 11→Return in the flowchart of FIG. 11. That is, if it is determined that it is at the time of the R range selection operation in Step S2, the steps proceed to Step S3, and in Step S3, the first gear stage of the EV gear shift stage is selected by stroking and engaging the third engagement clutch C3 to the left side (Left) by a command to the third electric actuator 33. In the subsequent Step S4, the operational position of the C1/C2 select operation mechanism 40 for selecting the first and the second engagement clutches C1, C2, is moved to an intermediate position between the first position and the second position. If a high battery SOC is determined in the subsequent Step S6, the steps proceed to Step S10, and a positive driving force is generated by the first motor/generator MG1. Therefore, in the subsequent Step S11, an EV reverse starting is carried out by the EV first gear stage, with the first motor/generator MG1 as the drive source, which is rotated in the direction opposite to the direction of rotation of the internal combustion engine ICE. When EV traveling is started by an EV reverse starting in the "EV mode," the steps that progress from Step S1→Step S12→Step S14→Return in the flowchart of FIG. 11 are repeated. As long as a high battery SOC is maintained in this reverse traveling state, in Step S14, a shift control is carried out by selecting the first shift schedule map illustrated in FIG. 15. If the battery SOC transitions to a low SOC state during forward traveling, the steps that progress from Step S1→Step S12→Step S13→Return in the flowchart of FIG. 11 are repeated, and a shift control is carried out by selecting the second shift schedule map illustrated in FIG. 14.

EV Reverse Starting Action at a Low SOC

At the time of EV reverse starting at a low SOC, the steps proceed from Step S1→Step S2→Step S3→Step S4→Step S6→Step S7→(Step S8→) Step S9→Step S11→Return in the flowchart of FIG. 11. That is, if it is determined that it is at the time of the R range selection operation in Step S2, the steps proceed to Step S3, and in Step S3, the first gear stage of the EV gear shift stage is selected by stroking and engaging the third engagement clutch C3 to the left side (Left) by a command to the third electric actuator 33. In the subsequent Step S4, the operational position of the C1/C2 select operation mechanism 40 for selecting the first and the second engagement clutches C1, C2 is moved to an intermediate position between the first position and the second position. If a low battery SOC is determined in the subsequent Step S6, the steps proceed to Step S7 and it is determined whether or not the internal combustion engine ICE is in operation; if ICE is in operation, the steps proceed directly to Step S9, and if the ICE is stopped, the engine is started in Step S8 and the steps proceed to Step S9. In Step S9, a positive driving force is generated by the first motor/generator MG1 and a negative driving force is generated by the second motor/generator MG2. Therefore, in the subsequent Step S11, an EV reverse starting is carried out by the EV first gear stage, with the first motor/generator MG1 as the drive source, while generating power by the second motor/generator MG2. When EV traveling is started by an EV reverse starting in the "series HEV mode," the steps that progress from Step S1→Step S12→Step S13→Return in the flowchart of FIG. 11 are repeated. As long as a low battery SOC is maintained in this reverse traveling state, in Step S13, a shift control is carried out by selecting the second shift schedule map illustrated in FIG. 14. If the battery SOC transitions to a high SOC state during reverse traveling, the steps that progress from Step S1→Step S12→Step S14→Return in the flowchart of FIG. 11 are repeated, and a shift control is carried out by selecting the first shift schedule map illustrated in FIG. 15.

Action of the Starting Control

For example, at the time of an EV forward starting at a high SOC, an EV forward starting is carried out by the EV first gear stage, with the first motor/generator MG1 as the drive source, as described above. At this time, the first engagement clutch C1 and the second engagement clutch C2 are placed in a neutral state that is not engaged to the "Left" or to the "Right" under normal circumstances. However, the ICE first gear stage is selected if the first engagement clutch C1 is engaged to the "Left," the ICE second gear stage is selected if the second engagement clutch C2 is engaged to the "Left," and the ICE third gear stage is selected if the first engagement clutch C1 is engaged to the "Right," due to an abnormality of the electronic control system, or the like. In this manner, if an ICE gear shift stage (first gear to the third gear) is selected, the stopped internal combustion engine ICE and the drive wheels 19 are drivingly connected, and the internal combustion engine ICE is rotated by the drive wheels 19.

For example, at the time of an EV forward starting at a low SOC, an EV forward starting is carried out by the EV first gear stage, with the first motor/generator MG1 as the drive source, while generating power by the second motor/generator MG2, as described above. At this time, the first engagement clutch C1 and the second engagement clutch C2 are placed in a neutral state that is not engaged to the "Left" or to the "Right" under normal circumstances. However, the ICE first gear stage is selected if the first engagement clutch C1 is engaged to the "Left," the ICE second gear stage is selected if the second engagement clutch C2 is engaged to the "Left," and the ICE third gear stage is selected if the first engagement clutch C1 is engaged to the "Right," due to an abnormality of the electronic control system or the like. In this manner, if an ICE gear shift stage (first gear to the third gear) is selected, the internal combustion engine ICE in operation and the drive wheels 19 are drivingly connected, and the torque from the internal combustion engine ICE is transmitted to the drive wheels 19.

If an ICE gear shift stage (first gear to the third gear) is selected due to an abnormality of the electronic control system or the like, at the time of such EV forward starting, the stopped internal combustion engine ICE and the drive wheels 19 are drivingly connected; however, at the time of an EV forward starting, the directions of rotation of the first motor/generator MG1 and the internal combustion engine ICE are the same. Consequently, at the time of an EV forward starting at a high SOC, the stopped internal combustion engine ICE is rotated by the drive wheels 19, and the load of the first motor/generator MG1 is increased. In addition, at the time of an EV forward starting at a low SOC, the torque from the internal combustion engine ICE in operation is transmitted to the drive wheels 19, and the load of the internal combustion engine ICE is increased. In this manner, since the directions of rotation of the first motor/generator MG1 and the internal combustion engine ICE are the same, only the load of the first motor/generator MG1 and the internal combustion engine ICE is increased, and the effect of selecting an ICE gear shift stage is small.

On the other hand, at the time of an EV reverse starting, the directions of rotation of the first motor/generator MG1 and the internal combustion engine ICE are opposite. Therefore, if an ICE gear shift stage (first gear to the third gear) is selected due to an abnormality of the electronic control system or the like, the effect of selecting an ICE gear shift stage becomes great compared to when carrying out an EV forward starting. For example, if an ICE gear shift stage (first gear to the third gear) is selected due to an abnormality of the electronic control system or the like, at the time of an EV reverse starting at a high SOC, the stopped internal combustion engine ICE and the drive wheels 19 are drivingly connected, and the internal combustion engine ICE is rotated in the reverse direction by the drive wheels 19. If the internal combustion engine ICE is reversely rotated, the exhaust gas is drawn in, and an ignition delay occurs at the time of engine start; therefore, it takes time to start the engine when starting the internal combustion engine ICE. In addition, a reverse rotation driving force by the internal combustion engine ICE is input to the engine accessories, which may damage the engine accessories. For example, if an ICE gear shift stage (first gear to the third gear) is selected due to an abnormality of the electronic control system or the like, at the time of an EV reverse starting at a low SOC, the internal combustion engine ICE in operation and the drive wheels 19 are drivingly connected, and the internal combustion engine ICE attempts to rotate the drive wheels 19 in the forward direction. In this case, there is the risk that a forward starting not intended by the driver will occur.

In contrast, in the first embodiment, if it is determined that it is at the time of the R range selection operation, the first gear stage of the EV gear shift stage is selected by the third engagement clutch C3. At the same time that the EV first gear stage is selected, the operational position of the C1/C2 select operation mechanism 40 for selecting the first and the second engagement clutches C1, C2 is moved to an intermediate position between the first position and the second position to select an intermediate position.

Figure 16:
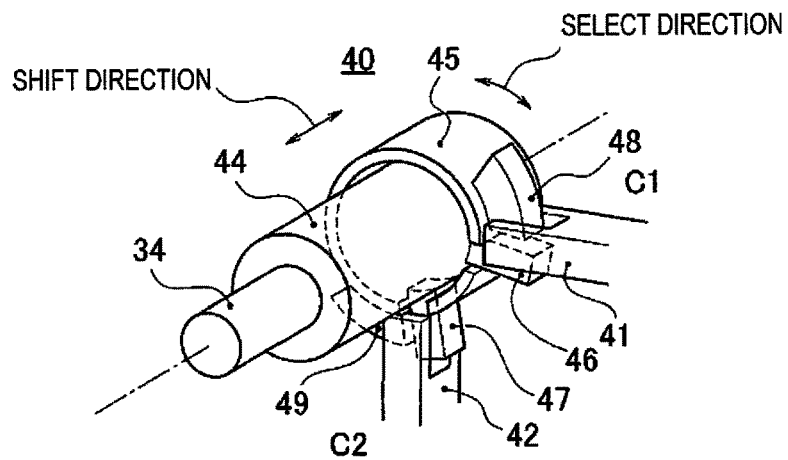
FIG. 16 is a perspective view illustrating the selected state of an intermediate position between the first position and the second position in the C1/C2 select operation mechanism of the first embodiment.
Figure 17:
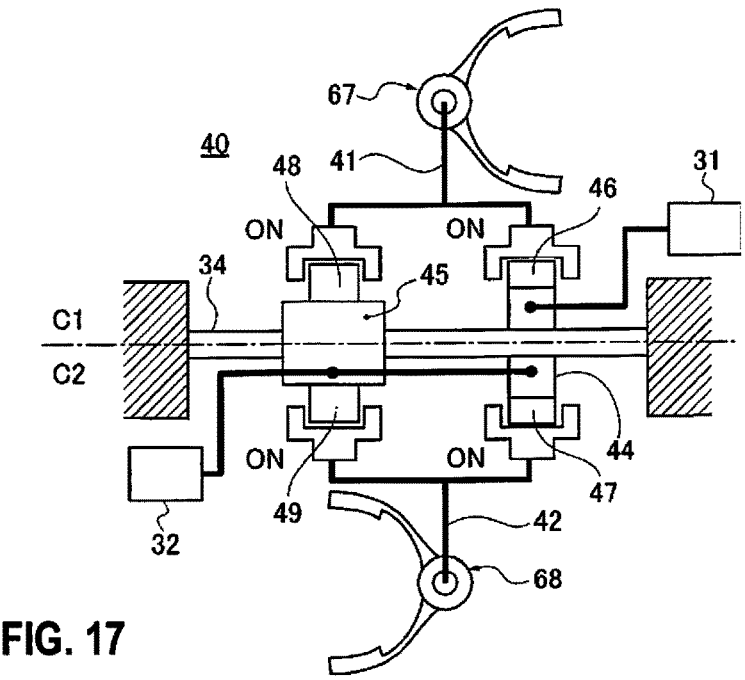
FIG. 17 is a schematic diagram illustrating the selected state of the intermediate position between the first position and the second position in the C1/C2 select operation mechanism of the first embodiment.
Figure 18:
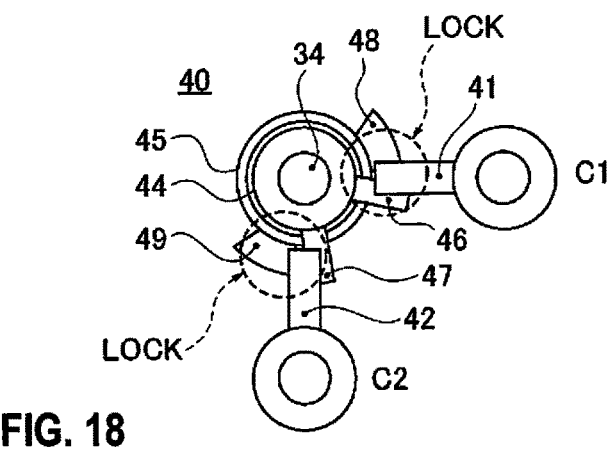
FIG. 18 is an axial view illustrating the selected state of the intermediate position between the first position and the second position in the C1/C2 select operation mechanism of the first embodiment.

When the intermediate position is selected by the second electric actuator 32 for the C1, C2 select operation, the movable ring 45 and the C1 shift operation mechanism 41 are connected via the first connecting lock pin 48, as illustrated in FIG. 16-FIG. 18 (upper right ON portion in FIG. 17, upper LOCK portion in FIG. 18). Additionally, the movable ring 45 and the C2 shift operation mechanism 42 are connected via the second connecting lock pin 49 (lower left ON portion in FIG. 17, lower LOCK portion in FIG. 18). Furthermore, when the intermediate position is selected by the second electric actuator 32 for the C1, C2 select operation, the movable shaft 44 and the C1 shift operation mechanism 41 are connected via the first neutral lock pin 46 (upper right ON portion in FIG. 17, upper LOCK portion in FIG. 18). Additionally, the movable shaft 44 and the C2 shift operation mechanism 42 are connected via the second neutral lock pin 47 (lower right ON portion in FIG. 17, lower LOCK portion in FIG. 18). Therefore, the shift operation of the C1 shift operation mechanism 41 and the shift fork 67 is inhibited, and the first engagement clutch C1 is locked in the neutral position. At the same time, the shift operation of the C2 shift operation mechanism 42 and the shift fork 68 is inhibited, and the second engagement clutch C2 is locked in the neutral position.

Therefore, even if a command is issued to select an ICE gear shift stage (first gear to the third gear) due to an abnormality of the electronic control system or the like, at the time of an EV reverse starting in which the directions of rotation of the first motor/generator MG1 and the internal combustion engine ICE are opposite, the first engagement clutch C1 and the second engagement clutch C2 are maintained in the state of being locked in the neutral position. Locking of the first engagement clutch C1 and the second engagement clutch C2 to the neutral position is carried out regardless of whether the mode selection is "EV mode" or "series HEV mode," as long as it is at the time of an R range selection operation, in which the driver intends a reverse starting.

Characteristic Action of the Starting Control

The mechanism of the first embodiment is configured such that, upon an EV reverse starting, the EV first gear stage of the multistage gear transmission 1 is selected by the third electric actuator 33, and the selection of the ICE gear shift stage by the first electric actuator 31 and the second electric actuator 32 are prevented. Then, the first motor/generator MG1 is configured to be rotated in the direction opposite to the forward direction of rotation of the internal combustion engine ICE. That is, selection of the ICE gear shift stage by the first electric actuator 31 and the second electric actuator 32 is prevented even when an engagement command is issued to the engagement clutches C1, C2 that select the ICE gear shift stage, due to an abnormality in the electronic control system. Thus, a torque transmission cutoff state is ensured, in which the power transmission path between the internal combustion engine ICE and the drive wheels 19 is disconnected at the position of the engagement clutches C1, C2 that select the ICE gear shift stage. On the other hand, since a drive power transmission path via the EV first gear stage is formed between the first motor/generator MG1 and the drive wheels 19, if the first motor/generator MG1 is reversely rotated, an EV reverse starting is carried out. As a result, an EV reverse starting intended by the driver can be ensured, even when an engagement command is issued to engagement clutches C1, C2 that select an ICE gear shift stage, when carrying out the EV reverse starting.

The mechanism of the first embodiment is configured such that, upon an EV reverse starting when the internal combustion engine ICE is in a stopped state, the selection of the ICE gear shift stage by the first electric actuator 31 and the second electric actuator 32 is prevented. That is, upon an EV reverse starting when the internal combustion engine ICE is in a stopped state, the flow of the drive force from the drive wheels 19 toward the internal combustion engine ICE is blocked at the position of the engagement clutches C1, C2 that select the ICE gear shift stage; therefore, a reverse rotation of the internal combustion engine ICE is prevented. Therefore, upon an EV reverse starting when the internal combustion engine ICE is in a stopped state, delayed starting of the internal combustion engine ICE and damage to the engine accessories are prevented, even when an engagement command is issued to the engagement clutches C1, C2 that select an ICE gear shift stage.

The mechanism of the first embodiment is configured such that, upon an EV reverse starting when the internal combustion engine ICE is in a rotating state, the selection of the ICE gear shift stage by the first electric actuator 31 and the second electric actuator 32 is prevented. That is, upon an EV reverse starting when the internal combustion engine ICE is in a rotating state, the flow of the drive force from the internal combustion engine ICE toward the drive wheels 19 is blocked at the position of the engagement clutches C1, C2 that select the ICE gear shift stage. That is, the drive wheels 19 will not be driven in the forward starting direction, with the internal combustion engine ICE as the drive source. Therefore, upon an EV reverse starting when the internal combustion engine ICE is in a rotating state, an EV forward starting not intended by the driver is prevented, even when an engagement command is issued to engagement clutches C1, C2 that select an ICE gear shift stage.

The mechanism of the first embodiment is configured such that, upon an EV reverse starting by the drive mode of the "series HEV mode," with the first motor/generator MG1 as the drive source, while generating power by the second motor/generator MG2 by the operation of the internal combustion engine ICE, the selection of the ICE gear shift stage by the first electric actuator 31 is prevented. That is, upon an EV reverse starting in a power generation state by the driving of the internal combustion engine ICE, the flow of the drive force from the internal combustion engine ICE toward the drive wheels 19 is blocked at the position of the engagement clutches C1, C2 that select the ICE gear shift stage. That is, a portion of the drive force of the internal combustion engine ICE will not be transmitted to the drive wheels 19, and the drive force of the internal combustion engine ICE is transmitted only to the second motor/generator MG2. Therefore, when carrying out an EV reverse starting in the "series HEV mode," power generation by the internal combustion engine ICE is ensured even when an engagement command is issued to engagement clutches C1, C2 that select an ICE gear shift stage.

The first embodiment is configured such that, upon an EV reverse starting, the selected operation position of the C1/C2 select operation mechanism 40 by the second actuator 32 is set to the neutral lock position, in which the engagement clutches C1, C2 that select the ICE gear shift stage are locked in the neutral position. That is, at the time of an EV reverse starting, a stroke operation from the neutral position for selecting the ICE gear shift stage by the C1/C2 select operation mechanism 40 is prevented, even when an engagement command is issued to the first electric actuator 31 of the engagement clutches C1, C2 that select the ICE gear shift stage. Therefore, the drive force transmission between the internal combustion engine ICE and the drive wheels 19 is blocked at the position of the engagement clutches C1, C2 that select the ICE gear shift stage, simply by setting the selected operation position of the C1/C2 select operation mechanism 40 to the neutral lock position.

Next, the effects are described. The effects listed below can be obtained by the start control device for a hybrid vehicle according to the first embodiment.

(1) In a hybrid vehicle comprising an electric motor (first motor/generator MG1) and an internal combustion engine ICE as drive sources, also provided with a transmission (multistage gear transmission 1) that realizes a plurality of gear shift stages in a drive system from the power sources to a drive wheel 19, and the transmission (multistage gear transmission 1) having no starting elements but including a plurality of engagement clutches C1, C2, C3 as shifting elements for meshing engagement due to a stroke from a neutral position that switches between an EV gear shift stage by the electric motor (first motor/generator MG1) and an ICE gear shift stage by the internal combustion engine ICE, the transmission (multistage gear transmission 1) is provided with an EV shift actuator (third electric actuator 33) that selects an EV gear shift stage, and ICE shift actuators (first electric actuator 31, second electric actuator 32) that select an ICE gear shift stage, a starting controller (transmission control unit 23) is configured to cause the EV shift actuator (third electric actuator 33) to select an EV gear shift stage (EV 1st) of the transmission (multistage gear transmission 1) at the time of starting, and carry out an EV starting using the electric motor (first motor/generator MG1) as the drive source, and the starting controller (transmission control unit 23, FIG. 2) is configured to be a mechanism that prevents a selection of the ICE gear shift stage by the ICE shift actuators (first electric actuator 31, second electric actuator 32) at the time of EV reverse starting, and rotates the electric motor (first motor/generator MG1) in a direction opposite of a forward rotation direction of the internal combustion engine ICE. Thus, an EV reverse starting intended by the driver can be ensured, even when an engagement command is issued to engagement clutches C1, C2 that select an ICE gear shift stage, when carrying out the EV reverse starting.

(2) The starting controller (transmission control unit 23, FIG. 2) is configured to be a mechanism to prevent the selection of the ICE gear shift stage by the ICE shift actuators (first electric actuator 31, second electric actuator 32), at the time of an EV reverse starting when the internal combustion engine ICE is in a stopped state. Thus, in addition to the effect of (1), at the time of an EV reverse starting when the internal combustion engine ICE is in a stopped state, delayed starting of the internal combustion engine ICE and damage to the engine accessories are prevented, even when an engagement command is issued to the engagement clutches C1, C2 that select an ICE gear shift stage.

(3) The starting controller (transmission control unit 23, FIG. 2) is configured to be a mechanism to prevent the selection of the ICE gear shift stage by the ICE shift actuators (first electric actuator 31, second electric actuator 32), at the time of an EV reverse starting when the internal combustion engine ICE is in a rotating state. Thus, in addition to the effect of (1) or (2), at the time of an EV reverse starting when the internal combustion engine ICE is in a rotating state, an EV forward starting not intended by the driver is prevented, even when an engagement command is issued to engagement clutches C1, C2 that select an ICE gear shift stage.

(4) A first electric motor (first motor/generator MG1) that is mechanically coupled to the drive wheels 19 when selecting an EV gear shift stage, and a second electric motor (second motor/generator MG2) that is mechanically coupled to the internal combustion engine ICE when not selecting an ICE gear shift stage, are provided as electric motors, and the starting controller (transmission control unit 23, FIG. 2) is configured to be a mechanism to prevent the selection of the ICE gear shift stage by the ICE shift actuators (first electric actuator 31, second electric actuator 32), at the time of an EV reverse starting by the drive mode of a "series HEV mode," with the first electric motor (first motor/generator MG1) as the drive source, while generating power by the second electric motor (the second motor/generator MG2) by an operation of the internal combustion engine ICE. Thus, in addition to the effect of (2), when carrying out an EV reverse starting in the "series HEV mode," power generation by the internal combustion engine ICE is ensured even when an engagement command is issued to engagement clutches C1, C2 that select an ICE gear shift stage.

(5) A select actuator (second electric actuator 32) that operates a select mechanism for selecting one engagement clutch from a plurality of engagement clutches C1, C2 that select an ICE gear shift stage, and a shift actuator (first electric actuator 31) that causes the engagement clutch that was selected to stroke in the engaging direction, are provided as ICE shift actuators, and the starting controller (transmission control unit 23, FIG. 2) sets the selected operation position of a select mechanism (C1/C2 select operation mechanism 40) by the select actuator (second actuator 32) to a neutral lock position, in which the engagement clutches C1, C2 that select the ICE gear shift stage are locked in a neutral position, at the time of an EV reverse starting (FIGS. 16-18). Thus, in addition to the effects of (1) to (4), the drive force transmission between the internal combustion engine ICE and the drive wheels 19 can be blocked at the position of the engagement clutches C1, C2 that select the ICE gear shift stage, simply by setting the selected operation position of the select mechanism (C1/C2 select operation mechanism 40) to the neutral lock position.

Second Embodiment

The second embodiment is an example in which the position for selecting an ICE gear shift stage to an idle stroke position of the shift stroke by the second electric actuator 32 for the C1, C2 select operation.

The configuration is described first. Of the configurations of the start control device for a hybrid vehicle in the second embodiment, the "overall system configuration," the "configuration of the shift control system," the "configuration of the gear shift stages," and the "detailed configuration of the C1/C2 select operation mechanism" are the same as the first embodiment, and thus the descriptions thereof are omitted. The "configuration of the shift control process" of the second embodiment will be described below.

Configuration of the Starting Control Process

Figure 19:
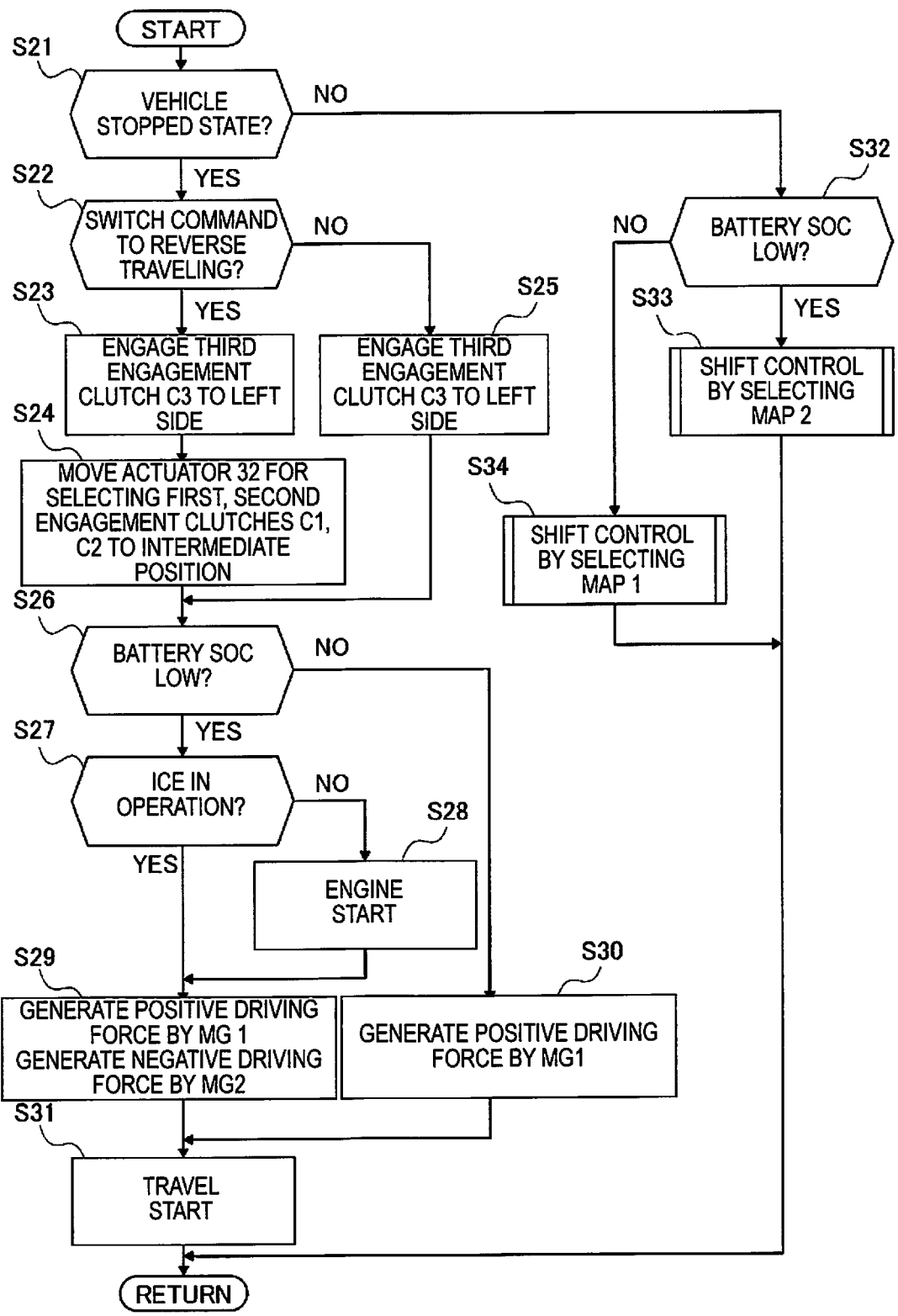
FIG. 19 is a flowchart illustrating the flow of a starting control process carried out in a transmission control unit of the second embodiment.

FIG. 19 illustrates the sequence of starting control steps carried out by the transmission control unit 23 (starting controller) of the second embodiment. Each of the steps in FIG. 19, which shows one example of the configuration of the starting control process, will be described below. Each of the steps of Step S21-Step S23 corresponds to each of the steps of Step S1-Step S3 in FIG. 11. Each of the steps of Step S25-Step S34 corresponds to each of the steps of Step S5-Step S14 in FIG. 11. Therefore, only Step S24 will be described.

In Step S24, following the left side engagement of the third engagement clutch C3 in Step S23, the operational position of the C1/C2 select operation mechanism 40 for selecting the first and the second engagement clutches C1, C2 is moved to a miss-stroke position, and the steps proceed to Step S26. Here, the "miss-stroke position" is a position to cause the shift stroke to miss by the C1/C2 select operation mechanism 40, even if there is a shift stroke to engage the first engagement clutch C1 or the second engagement clutch C2 by the first electric actuator 31. That is, the idle stroke position is a position in which a shift stroke operation from the first electric actuator 31 is not transmitted to the shift fork 67 of the first engagement clutch C1 or the shift fork 68 of the second engagement clutch C2.

Next, the action of the starting control will be described. In the second embodiment, if it is determined that it is at the time of the R range selection operation, the first gear stage of the EV gear shift stage is selected by the third engagement clutch C3. The EV first gear stage is selected, and the operational position of the C1/C2 select operation mechanism 40 for selecting the first and the second engagement clutches C1, C2 is moved to an idle stroke position that deviates from both the first position and the second position, to select this idle stroke position.

Figure 20:
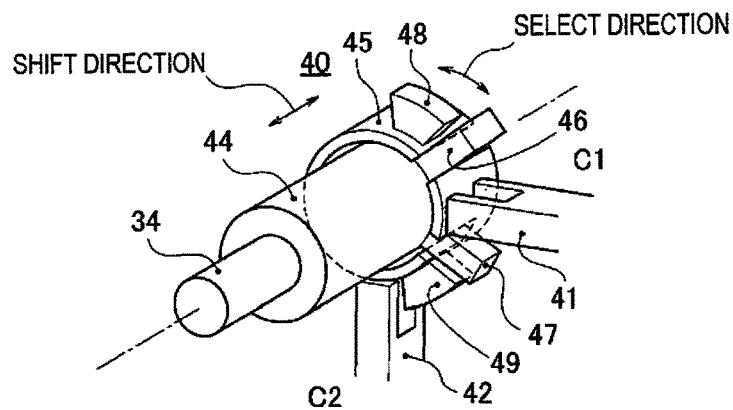
FIG. 20 is a perspective view illustrating the selected state of an idle stroke position of a shift stroke in the C1/C2 select operation mechanism of the second embodiment.
Figure 21:
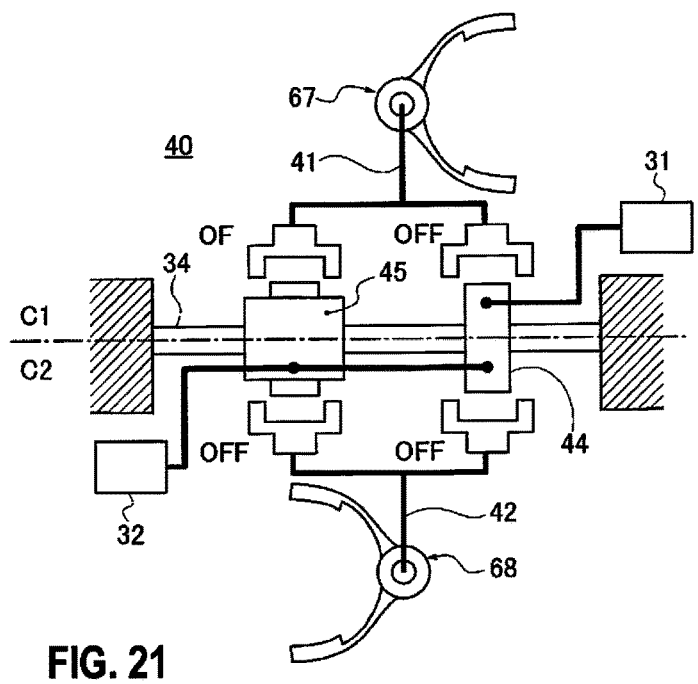
FIG. 21 is a schematic diagram illustrating the selected state of the idle stroke position of the shift stroke in the C1/C2 select operation mechanism of the second embodiment.
Figure 22:
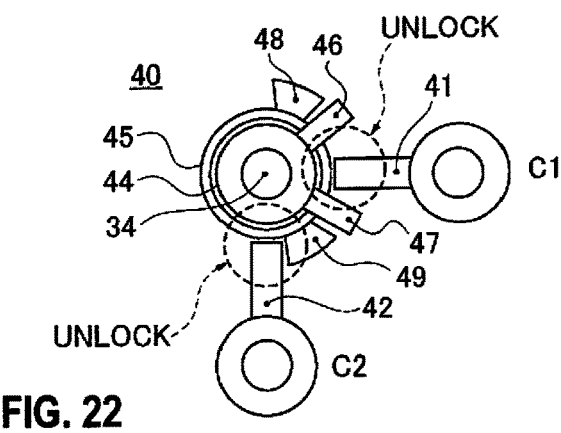
FIG. 22 is an axial view illustrating the selected state of the idle stroke position of the shift stroke in the C1/C2 select operation mechanism of the second embodiment.

When the idle stroke position is selected by the second electric actuator 32 for the C1, C2 select operation, the movable ring 45 and the C1 shift operation mechanism 41 are not connected via the first connecting lock pin 48, as illustrated in FIG. 20-FIG. 22 (upper left ON portion in FIG. 21, upper UNLOCK portion in FIG. 22). Additionally, the movable ring 45 and the C2 shift operation mechanism 42 are not connected via the second connecting lock pin 49 (lower left OFF portion in FIG. 21, lower UNLOCK portion in FIG. 22). Furthermore, when the idle stroke position is selected by the second electric actuator 32 for the C1, C2 select operation, the movable shaft 44 and the C1 shift operation mechanism 41 are not connected via the first neutral lock pin 46 (upper right OFF portion in FIG. 21, upper UNLOCK portion in FIG. 22). Additionally, the movable shaft 44 and the C2 shift operation mechanism 42 are not connected via the second neutral lock pin 47 (lower right OFF portion in FIG. 21, lower UNLOCK portion in FIG. 18). Therefore, even if the first electric actuator 31 carries out a shift stroke, the shift operation of the C1 shift operation mechanism 41 and the shift fork 67 is prevented by the stroke miss in the C1/C2 select operation mechanism 40. In addition, even if the first electric actuator 31 carries out a shift stroke, the shift operation of the C2 shift operation mechanism 42 and the shift fork 68 is prevented by the stroke miss in the C1/C2 select operation mechanism 40. That is, the first engagement clutch C1 and the second engagement clutch C2 are maintained in the neutral position.

Therefore, even if a command is issued to select an ICE gear shift stage (first gear to the third gear) due to an abnormality of the electronic control system or the like, at the time of an EV reverse starting, in which the directions of rotation of the first motor/generator MG1 and the internal combustion engine ICE are opposite, the first engagement clutch C1 and the second engagement clutch C2 are maintained in the neutral position.

As described above, the second embodiment is configured such that, at the time of an EV reverse starting, the selected operation position of the C1/C2 select operation mechanism 40 is set to a position in which the shift stroke to select an ICE gear shift stage by the first electric actuator 31 becomes an idle stroke. That is, when an engagement command is issued to the first actuator 31 of the engagement clutches C1, C2 that select an ICE gear shift stage when carrying out an EV reverse starting, an operation of a shift stroke from the neutral position is permitted. However, by making the shift stroke operation an idle stroke by the C1/C2 select operation mechanism 40, an engagement of the engagement clutches C1, C2 that select an ICE gear shift stage is prevented. Therefore, the drive force transmission between the internal combustion engine ICE and the drive wheels 19 is blocked at the position of the engagement clutches C1, C2 that select the ICE gear shift stage simply by setting the selected operation position of the C1/C2 select operation mechanism 40 to the idle stroke position.

Next, the effects are described. The effects listed below can be obtained by the start control device for a hybrid vehicle according to the second embodiment.

(6) A select actuator (second electric actuator 32), which operates a select mechanism for selecting one engagement clutch from a plurality of engagement clutches C1, C2 that select an ICE gear shift stage, and a shift actuator (first electric actuator 31), which causes the engagement clutch that was selected to stroke in the engaging direction, are provided as ICE shift actuators, and at the time of an EV reverse starting, the starting controller (transmission control unit 23, FIG. 2) sets the selected operation position of the select mechanism (C1/C2 select operation mechanism 40) with the select actuator (second actuator 32) to an idle stroke position, in which the engagement clutches C1, C2 that select the ICE gear shift stage are maintained in the neutral position (FIG. 20-FIG. 22), even if there is a shift stroke for selecting an ICE gear shift stage by the shift actuator (first electric actuator 31). Thus, in addition to the effects of (1)-(4) of the first embodiment, the drive force transmission between the internal combustion engine ICE and the drive wheels 19 can be blocked at the position of the engagement clutches C1, C2 that select the ICE gear shift stage, simply by setting the selected operation position of the select mechanism (C1/C2 select operation mechanism 40) to the idle stroke position.

The start control device for a hybrid vehicle of the present invention was described above based on the first embodiment and the second embodiment, but specific configurations thereof are not limited to the first and second embodiments, and various modifications and additions to the present invention can be made without departing from the scope of the invention according to each claim in the Claims.

In the first embodiment, an example was shown in which the selected operation position of the C1/C2 select operation mechanism 40 is set to an intermediate position between the first position and the second position by the second electric actuator 32, as a mechanism for preventing the selection of an ICE gear shift stage, at the time of EV reverse starting. In the second embodiment, an example was shown in which the selected operation position of the C1/C2 select operation mechanism 40 is set to an idle stroke position by the second electric actuator 32, as a mechanism of preventing the selection of an ICE gear shift stage, at the time of EV reverse starting. However, the specific configuration of the mechanism for preventing the selection of an ICE gear shift stage at the time of EV reverse starting is not limited to the mechanism described in the first embodiment and the second embodiment, as long as the mechanism can prevent the selection of an ICE gear shift stage by the ICE shift actuator upon EV reverse starting.

In the first embodiment, an example was shown in which the start control device of the present invention is applied to a hybrid vehicle comprising, as drive system components, one engine, two motor/generators, and a multistage gear transmission having three engagement clutches. However, the start control device of the present invention may be applied to hybrid vehicles comprising one engine, one motor/generator, and a multistage gear transmission having an engine clutch that selects an EV gear shift stage, and an engagement clutch that selects an ICE gear shift stage.

The invention claimed is:

1. A hybrid vehicle start control device for a hybrid vehicle having an electric motor and an internal combustion engine as drive sources, and having a transmission that realizes a plurality of gear shift stages in a drive system from the power sources to a drive wheel, the transmission having no starting elements but including a plurality of engagement clutches each configured to be stroked from a neutral position to an engagement position to shift among a plurality of EV gear shift stages through which a driving force is transferred to the drive wheel from the electric motor and a plurality of ICE gear shift stages through which a driving force is transferred to the drive wheel from the internal combustion engine, and the transmission having an EV shift actuator that selects among the EV gear shift stages, and ICE shift actuators that have operating positions to select the ICE gear shift stages and an operating position that prevents a selection of the ICE gear shift stage, the start control device comprising:

a starting controller configured to cause the EV shift actuator to select the EV gear shift stage of the transmission at a time of starting, and carry out an EV starting using the electric motor as the drive source, and at a time of an EV reverse starting, the starting controller being configured to carry out a prevention control to move the ICE shift actuators to the operating position that prevents the selection of the ICE gear shift stage even in a case where an engagement command for selecting one of the ICE gear shift stages is issued at the time of the EV reverse starting.

2. The hybrid vehicle control device as recited in claim 1, wherein the starting controller is configured to carry out the prevention control at the time of the EV reverse starting when the internal combustion engine is in a stopped state.

3. The hybrid vehicle start control device as recited in claim 2, wherein the starting controller is configured to carry out the prevention control at the time of the EV reverse starting when the internal combustion engine is in a rotating state.

4. The hybrid vehicle start control device as recited in claim 2, wherein the electric motor includes a first electric motor that is mechanically coupled to the drive wheel when selecting the EV gear shift stage, and a second electric motor that is mechanically coupled with the internal combustion engine when not selecting the ICE gear shift stage, and the starting controller is configured to carry out the prevention control at the time of the EV reverse starting by a drive mode of a series HEV mode, with the first electric motor as the drive source, while generating power by the second electric motor by an operation of the internal combustion engine.

5. The hybrid vehicle start control device as recited in claim 2, wherein the ICE shift actuators include a select actuator that operates a select mechanism for selecting one engagement clutch from the plurality of engagement clutches that select the ICE gear shift stage, and a shift actuator that causes the engagement clutch that was selected to stroke in an engaging direction, and in the prevention control, the starting controller is configured to control a selected operation position of the select mechanism by the select actuator to a neutral lock position, in which the engagement clutches that select the ICE gear shift stage are locked in a neutral position, at the time of the EV reverse starting.

6. The hybrid vehicle start control device as recited in claim 2, wherein
a select actuator that operates a select mechanism for selecting one engagement clutch from the plurality of engagement clutches that select the ICE gear shift stage, and a shift actuator that causes the engagement clutch that was selected to stroke in an engaging direction, and
in the prevention control at the time of an EV reverse starting, the starting controller is configured to control a selected operation position of the select mechanism by the select actuator to an idle stroke position, in which the engagement clutches that select the ICE gear shift stage are maintained in a neutral position, even if a shift stroke is present for selecting the ICE gear shift stage by the shift actuator.

7. The hybrid vehicle start control device as recited in claim 1, wherein
the starting controller is configured to carry out the prevention control at the time of the EV reverse starting when the internal combustion engine is in a rotating state.

8. The hybrid vehicle start control device as recited in claim 7, wherein
the electric motor includes a first electric motor that is mechanically coupled to the drive wheel when selecting the EV gear shift stage, and a second electric motor that is mechanically coupled with the internal combustion engine when not selecting the ICE gear shift stage, and
the starting controller is configured to carry out the prevention control at the time of the EV reverse starting by a drive mode of a series HEV mode, with the first electric motor as the drive source, while generating power by the second electric motor by an operation of the internal combustion engine.

9. The hybrid vehicle start control device as recited in claim 1, wherein
the electric motor includes a first electric motor that is mechanically coupled to the drive wheel when selecting the EV gear shift stage, and a second electric motor that is mechanically coupled with the internal combustion engine when not selecting the ICE gear shift stage, and
the starting controller is configured to carry out the prevention control at the time of the EV reverse starting by a drive mode of a series HEV mode, with the first electric motor as the drive source, while generating power by the second electric motor by an operation of the internal combustion engine.

10. A hybrid vehicle start control device for a hybrid vehicle having an electric motor and an internal combustion engine as drive sources, and having a transmission that realizes a plurality of gear shift stages in a drive system from the power sources to a drive wheel,
the transmission having no starting elements but including a plurality of engagement clutches each configured to be stroked from a neutral position to an engagement position to shift among a plurality of EV gear shift stages through which a driving force is transferred to the drive wheel from the electric motor and a plurality of ICE gear shift stages through which a driving force is transferred to the drive wheel from the internal combustion engine, and
the transmission having an EV shift actuator that selects among the EV gear shift stages, and ICE shift actuators that have operating positions to select the ICE gear shift stages and an operating position that prevents a selection of the ICE gear shift stage, the ICE shift actuators including a select actuator that operates a select mechanism for selecting one engagement clutch from the plurality of engagement clutches that select the ICE gear shift stage and a shift actuator that causes the engagement clutch that was selected to stroke in an engaging direction,
the start control device comprising:
a starting controller configured to cause the EV shift actuator to select the EV gear shift stage of the transmission at a time of starting, and carry out an EV starting using the electric motor as the drive source, and
at a time of an EV reverse starting, the starting controller being configured to carry out a prevention control to move the ICE shift actuators to the operating position that prevents the selection of the ICE gear shift stage, the prevention control being configured to set a selected operation position of the select mechanism by the select actuator to a neutral lock position, in which the engagement clutches that select the ICE gear shift stage are locked in a neutral position, at the time of the EV reverse starting.

11. The hybrid vehicle control device as recited in claim 10, wherein
the starting controller is configured to carry out the prevention control at the time of the EV reverse starting when the internal combustion engine is in a stopped state.

12. The hybrid vehicle start control device as recited in claim 10, wherein
the starting controller is configured to carry out the prevention control at the time of the EV reverse starting when the internal combustion engine is in a rotating state.

13. The hybrid vehicle start control device as recited in claim 10, wherein
the electric motor includes a first electric motor that is mechanically coupled to the drive wheel when selecting the EV gear shift stage, and a second electric motor that is mechanically coupled with the internal combustion engine when not selecting the ICE gear shift stage, and
the starting controller is configured to carry out the prevention control at the time of the EV reverse starting by a drive mode of a series HEV mode, with the first electric motor as the drive source, while generating power by the second electric motor by an operation of the internal combustion engine.

14. A hybrid vehicle start control device for a hybrid vehicle having an electric motor and an internal combustion engine as drive sources, and having a transmission that realizes a plurality of gear shift stages in a drive system from the power sources to a drive wheel,
the transmission having no starting elements but including a plurality of engagement clutches each configured to be stroked from a neutral position to an engagement position to shift among a plurality of EV gear shift stages through which a driving force is transferred to the drive wheel from the electric motor and a plurality of ICE gear shift stages through which a driving force is transferred to the drive wheel from the internal combustion engine, and
the transmission having an EV shift actuator that selects among the EV gear shift stages, and ICE shift actuators that have operating positions to select the ICE gear shift stages and an operating position that prevents a selection of the ICE gear shift stage, the ICE shift actuators including a select actuator that operates a select mechanism for selecting one engagement clutch from the plurality of engagement clutches that select the ICE gear shift stage, and a shift actuator that causes the engagement clutch that was selected to stroke in an engaging direction, the start control device comprising:

a starting controller configured to cause the EV shift actuator to select the EV gear shift stage of the transmission at a time of starting, and carry out an EV starting using the electric motor as the drive source, and at a time of an EV reverse starting, the starting controller being configured to carry out a prevention control to move the ICE shift actuators to the operating position that prevents the selection of the ICE gear shift stage, the prevention control being configured to set a selected operation position of the select mechanism by the select actuator to an idle stroke position, in which the engagement clutches that select the ICE gear shift stage are maintained in a neutral position, even if a shift stroke is present for selecting the ICE gear shift stage by the shift actuator.

15. The hybrid vehicle control device as recited in claim 14, wherein
the starting controller is configured to carry out the prevention control at the time of the EV reverse starting when the internal combustion engine is in a stopped state.

16. The hybrid vehicle start control device as recited in claim 14, wherein
the starting controller is configured to carry out the prevention control at the time of the EV reverse starting when the internal combustion engine is in a rotating state.

17. The hybrid vehicle start control device as recited in claim 14, wherein
the electric motor includes a first electric motor that is mechanically coupled to the drive wheel when selecting the EV gear shift stage, and a second electric motor that is mechanically coupled with the internal combustion engine when not selecting the ICE gear shift stage, and
the starting controller is configured to carry out the prevention control at the time of the EV reverse starting by a drive mode of a series HEV mode, with the first electric motor as the drive source, while generating power by the second electric motor by an operation of the internal combustion engine.

* * * * *